(12) United States Patent
Janarthanam et al.

(10) Patent No.: US 11,443,082 B2
(45) Date of Patent: Sep. 13, 2022

(54) UTILIZING DEEP LEARNING AND NATURAL LANGUAGE PROCESSING TO CONVERT A TECHNICAL ARCHITECTURE DIAGRAM INTO AN INTERACTIVE TECHNICAL ARCHITECTURE DIAGRAM

(71) Applicant: Accenture Global Solutions Limited, Dublin (IE)

(72) Inventors: Balaji Janarthanam, Chennai (IN); Abhishek Patni, Bangalore (IN); Anil Kumar, Bangalore (IN); Vinu Varghese, Bangalore (IN); Hari Kumar Karnati, Bangalore (IN); Saran Prasad, New Delhi (IN); Nirav Jagdish Sampat, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 199 days.

(21) Appl. No.: 16/884,783

(22) Filed: May 27, 2020

(65) Prior Publication Data
US 2021/0374304 A1    Dec. 2, 2021

(51) Int. Cl.
*G06F 30/18*     (2020.01)
*G06N 3/08*      (2006.01)
(Continued)

(52) U.S. Cl.
CPC .......... *G06F 30/18* (2020.01); *G06F 40/166* (2020.01); *G06F 40/40* (2020.01); *G06N 3/08* (2013.01);
(Continued)

(58) Field of Classification Search
CPC ........ G06F 30/18; G06F 40/166; G06F 40/40; G06F 40/279; G06N 3/08; G06V 30/40; G06V 30/10; G06V 30/416; G06V 30/422
See application file for complete search history.

(56) References Cited

U.S. PATENT DOCUMENTS 7,885,902 B1    2/2011    Shoemaker et al.
7,966,282 B2    6/2011    Pinckney et al.
(Continued)

FOREIGN PATENT DOCUMENTS

| CN | 109800761 A | * | 5/2019 | ............... G06K 9/34 |
| CN | 109800761 A | | 5/2019 | |
| CN | 109816118 A | | 5/2019 | |

*Primary Examiner* — Quoc A Tran
(74) *Attorney, Agent, or Firm* — Harrity & Harrity, LLP

(57) ABSTRACT

A device may receive input data identifying a technical architecture diagram, a design document, an interface specification document, and technical architecture icons, and may process the input data identifying the technical architecture diagram, with a model, to determine hierarchical objects from the technical architecture diagram. The device may perform OCR and NLP of the hierarchical objects to determine blocks of data, and may compare the blocks of data and the input data identifying the design document to identify functionalities of applications. The device may compare the blocks of data and the input data identifying the interface specification document to identify attributes, and may compare the blocks of data and the input data identifying the technical architecture icons to identify icons. The device may consolidate the blocks of data, the functionalities, the attributes, and the icons into a final document, and may perform actions based on the final document.

20 Claims, 19 Drawing Sheets

(51) Int. Cl.
  *G06F 40/40*   (2020.01)
  *G06F 40/166*  (2020.01)
  *G06V 30/40*   (2022.01)
  *G06V 30/10*   (2022.01)
  *G06N 3/04*    (2006.01)
  *G06N 20/00*   (2019.01)
  *G06V 30/416*  (2022.01)
  *G06V 30/422*  (2022.01)
  *G06F 40/279*  (2020.01)
  *G06F 17/00*   (2019.01)

(52) U.S. Cl.
  CPC ............ *G06V 30/40* (2022.01); *G06F 40/279* (2020.01); *G06N 3/0445* (2013.01); *G06N 20/00* (2019.01); *G06V 30/10* (2022.01); *G06V 30/416* (2022.01); *G06V 30/422* (2022.01)

(56) References Cited

U.S. PATENT DOCUMENTS

| | | | |
|---|---|---|---|
| 9,495,345 B2 | 11/2016 | Munro et al. | |
| 2015/0363197 A1 | 12/2015 | Carback, III et al. | |
| 2017/0262416 A1* | 9/2017 | Rezgui | G06F 40/146 |
| 2018/0075138 A1* | 3/2018 | Perram | G06F 16/93 |
| 2020/0034737 A1 | 1/2020 | Munro et al. | |

* cited by examiner

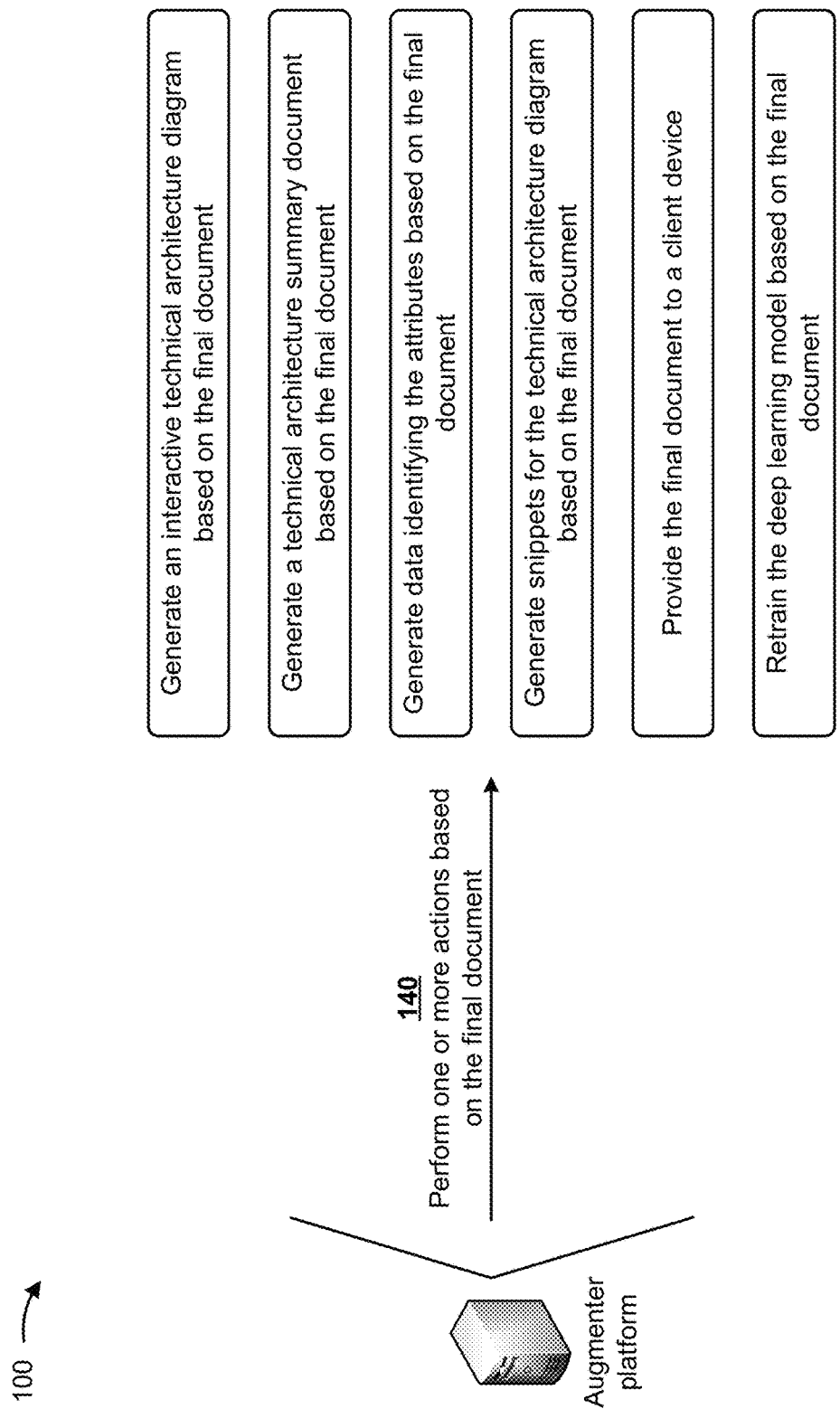

US 11,443,082 B2

UTILIZING DEEP LEARNING AND NATURAL LANGUAGE PROCESSING TO CONVERT A TECHNICAL ARCHITECTURE DIAGRAM INTO AN INTERACTIVE TECHNICAL ARCHITECTURE DIAGRAM

BACKGROUND

A technical architecture diagram is a graphical representation of a set of concepts (e.g., principles, elements, components, and/or the like) that are part of an architecture. For example, the technical architecture diagram may include a software technical architecture diagram, a system technical architecture diagram, an application technical architecture diagram, a security technical architecture diagram, and/or the like.

SUMMARY

According to some implementations, a method may include receiving input data identifying a technical architecture diagram, a design document associated with the technical architecture diagram, an interface specification document associated with the technical architecture diagram, and technical architecture icons associated with the technical architecture diagram. The method may include processing the input data identifying the technical architecture diagram, with a deep learning model, to determine hierarchical objects from the technical architecture diagram, and performing optical character recognition and natural language processing of the hierarchical objects to determine, from the hierarchical objects, blocks of data identifying a technical architecture of the technical architecture diagram. The method may include comparing the blocks of data and the input data identifying the design document to identify functionalities of applications associated with the technical architecture diagram, and comparing the blocks of data and the input data identifying the interface specification document to identify attributes associated with the technical architecture diagram. The method may include comparing the blocks of data and the input data identifying the technical architecture icons to identify icons associated with the technical architecture diagram, and consolidating the blocks of data, the identified functionalities, the identified attributes, and the identified icons into a final document. The method may include performing one or more actions based on the final document.

According to some implementations, a device may include one or more memories and one or more processors to receive input data identifying a technical architecture diagram, a design document associated with the technical architecture diagram, an interface specification document associated with the technical architecture diagram, and technical architecture icons associated with the technical architecture diagram. The one or more processors may process the input data identifying the technical architecture diagram, with a deep learning model, to determine hierarchical objects from the technical architecture diagram, and may perform optical character recognition and natural language processing of the hierarchical objects to determine, from the hierarchical objects, blocks of data identifying a technical architecture of the technical architecture diagram. The one or more processors may compare the blocks of data (e.g., identifying a technical architecture of the technical architecture diagram) and the input data identifying the design document to identify functionalities of applications associated with the technical architecture diagram, and may compare the blocks of data and the input data identifying the interface specification document to identify attributes associated with the technical architecture diagram. The one or more processors may compare the blocks of data and the input data identifying the technical architecture icons to identify icons associated with the technical architecture diagram, and may consolidate the blocks of data, the identified functionalities, the identified attributes, and the identified icons into a final document. The one or more processors may generate an interactive technical architecture diagram based on the final document, and may provide the interactive technical architecture diagram to a client device.

According to some implementations, a non-transitory computer-readable medium may store one or more instructions that, when executed by one or more processors of a device, may cause the one or more processors to receive input data identifying a technical architecture diagram, a design document associated with the technical architecture diagram, an interface specification document associated with the technical architecture diagram, and technical architecture icons associated with the technical architecture diagram. The one or more instructions may cause the one or more processors to process the input data identifying the technical architecture diagram, with a deep learning model, to determine hierarchical objects from the technical architecture diagram, and perform optical character recognition and natural language processing of the hierarchical objects to determine, from the hierarchical objects, blocks of data identifying a technical architecture of the technical architecture diagram. The one or more instructions may cause the one or more processors to compare the blocks of data and the input data identifying the design document to identify functionalities of applications associated with the technical architecture diagram, and compare the blocks of data and the input data identifying the interface specification document to identify attributes associated with the technical architecture diagram. The one or more instructions may cause the one or more processors to compare the blocks of data and the input data identifying the technical architecture icons to identify icons associated with the technical architecture diagram, and consolidate the blocks of data, the identified functionalities, the identified attributes, and the identified icons into a final document. The one or more instructions may cause the one or more processors to generate an interactive technical architecture diagram and a technical architecture summary document based on the final document, and provide the interactive technical architecture diagram and the technical architecture summary document to a client device.

BRIEF DESCRIPTION OF THE DRAWINGS

FIGS. 1A-1L are diagrams of an example implementation described herein.

DETAILED DESCRIPTION

Figure 1A:
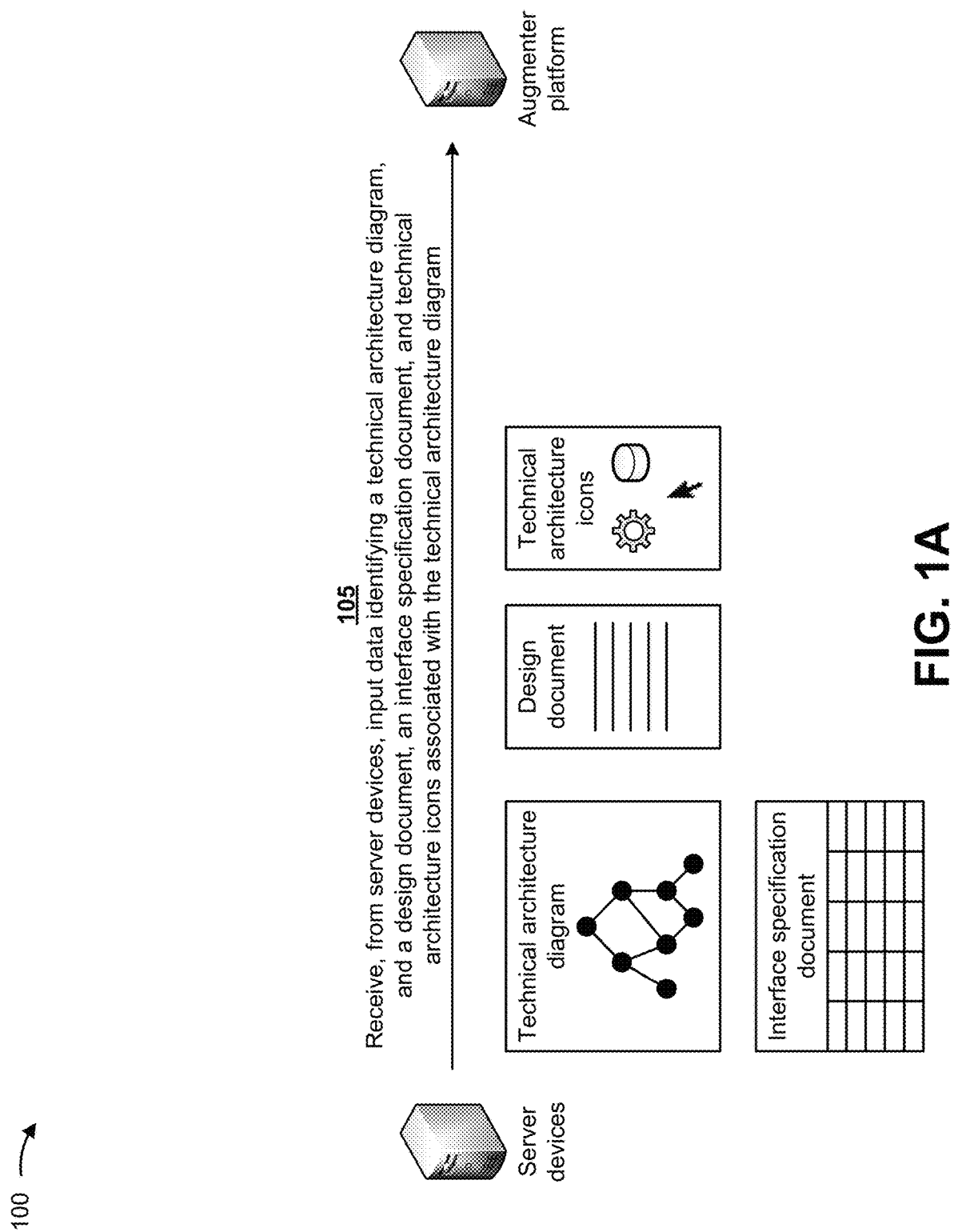

The following detailed description of example implementations refers to the accompanying drawings. The same reference numbers in different drawings may identify the same or similar elements.

Understanding a technical architecture diagram (e.g., an architecture for a telecommunications system) is a time consuming and difficult task. Current techniques for understanding technical architecture diagrams include reviewing the technical architecture diagrams, design documents for the technical architecture diagrams, interface specification documents for the technical architecture diagrams, and/or the like. However, it is quite challenging to correlate the technical architecture diagrams with the design documents, the interface specification documents, and/or the like in order to determine more details about the technical architecture diagrams. For example, technical personnel may be required to explain details of the technical architecture diagrams since the technical architecture diagrams are static images with many complexities that are documented in other artifacts. Thus, current techniques for understanding technical architecture diagrams waste human resources, computing resources (e.g., processing resources, memory resources, communication resources, and/or the like), networking resources, and/or the like associated with correlating the technical architecture diagrams with the design documents, the interface specification documents, and/or the like, incorrectly modifying the technical architecture documents based on misunderstandings of the technical architecture documents, correcting the incorrectly modified technical architecture documents, and/or the like.

Some implementations described herein provide an augmenter platform that utilizes deep learning and natural language processing to convert a technical architecture diagram into an interactive technical architecture diagram. For example, the augmenter platform may receive input data identifying a technical architecture diagram, a design document associated with the technical architecture diagram, an interface specification document associated with the technical architecture diagram, and technical architecture icons associated with the technical architecture diagram. The augmenter platform may process the input data identifying the technical architecture diagram, with a deep learning model, to determine hierarchical objects from the technical architecture diagram, and may perform optical character recognition and natural language processing of the hierarchical objects to determine, from the hierarchical objects, blocks of data identifying a technical architecture of the technical architecture diagram. The augmenter platform may compare the blocks of data and the input data identifying the design document to identify functionalities of applications associated with the technical architecture diagram, and may compare the blocks of data and the input data identifying the interface specification document to identify attributes associated with the technical architecture diagram. The augmenter platform may compare the blocks of data and the input data identifying the technical architecture icons to identify icons associated with the technical architecture diagram, and may consolidate the blocks of data, the identified functionalities, the identified attributes, and the identified icons into a final document. The augmenter platform may perform one or more actions based on the final document.

In this way, the augmenter platform utilizes deep learning and natural language processing to convert a technical architecture diagram into an interactive technical architecture diagram. The augmenter platform may include an augmentation layer, on top of the static technical architecture diagram, that provides a technical summary and additional information about each element the technical architecture diagram when a mouse is hovered over each element. For example, the augmenter platform may provide a quick snippet of each system in the technical architecture diagram when a mouse hovers over various components of the technical architecture diagram. This, in turn, conserves human resources, computing resources, networking resources, and/or the like that would otherwise have been wasted by correlating the technical architecture diagrams with the design documents, the interface specification documents, and/or the like, incorrectly modifying the technical architecture documents based on misunderstandings of the technical architecture documents, correcting the incorrectly modified technical architecture documents, and/or the like.

FIGS. 1A-1L are diagrams of one or more example implementations 100 described herein. As shown in FIG. 1A, server devices may be associated with an augmenter platform. The server devices may include server devices associated with entities that generate technical architecture diagrams (e.g., a telecommunications provider, a cloud provider, and/or the like). The augmenter platform may include a platform that utilizes deep learning and natural language processing to convert a technical architecture diagram into an interactive technical architecture diagram, as described herein.

As further shown in FIG. 1A, and by reference number 105, the augmenter platform may receive, from the server devices, input data identifying a technical architecture diagram, and a design document, an interface specification document, and technical architecture icons associated with the technical architecture diagram. The technical architecture diagram may be associated with a technical system (e.g., a computer system, a telecommunications system, and/or the like) and may graphically represent the components of a technical architecture (e.g., a software architecture, a system architecture, and/or the like) of the technical system. The design document may be a written description that describes a detailed operation of the technical system for use by designers, developers, other stakeholders, and/or the like associated with the system. The interface specification document may include a mapping (e.g., implemented via a table data structure) of a flow of data through the technical system (e.g., a mapping from source data to target data). The technical architecture icons may be maintained in a technical architecture icon repository, and may be provide graphical representations (e.g., icons, interconnections, and/or the like) associated with components that may be included in the technical system represented by the technical architecture diagram.

Figure 1B:
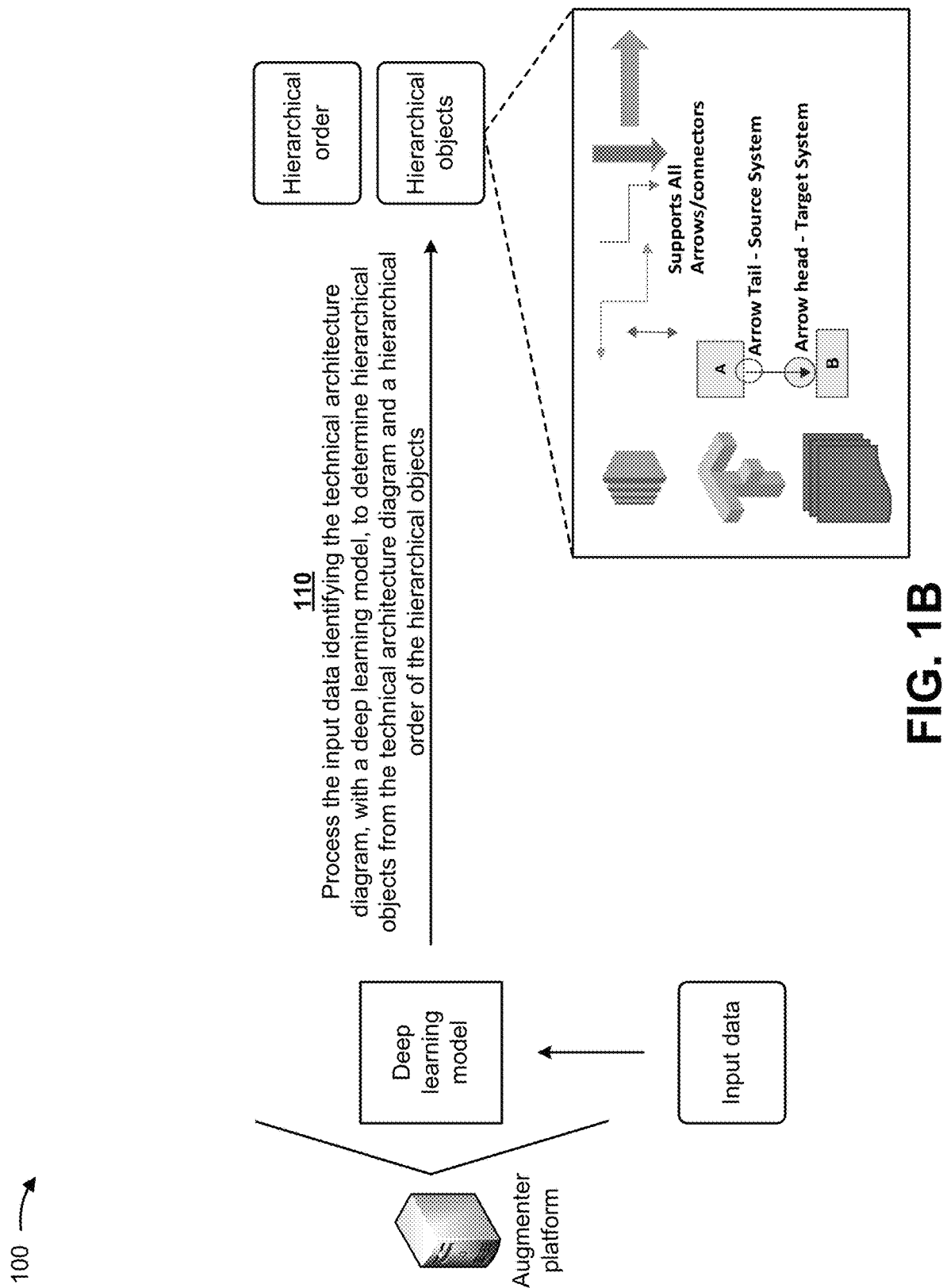

As shown in FIG. 1B, and by reference number 110, the augmenter platform may process the input data identifying the technical architecture diagram, with a deep learning model, to determine hierarchical objects from the technical architecture diagram and a hierarchical order of the hierarchical objects. The hierarchical objects may include a title of the technical architecture diagram, a quantity of blocks in the technical architecture diagram, a quantity of sub-blocks in the technical architecture diagram, a legend of the technical architecture diagram, an arrow of the technical architecture diagram, a connector of the technical architecture diagram, an icon of the technical architecture diagram, and/or the like. The hierarchical order of the hierarchical objects may include a hierarchical order of the blocks in the technical architecture diagram, a hierarchical order of sub-blocks for each of the blocks associated with the sub-blocks, a hierarchical order of the sub-blocks in the technical architecture diagram, and/or the like. For example, a first block representing a first system may receive inputs from a second block representing a second system and from sub-blocks representing components of the first system. In such an example, the first block may be provided first in a hierarchical order, the second block may be provided second in the hierarchical order, and the sub-blocks may be ordered under the first block and may include another hierarchical order under the first block. In some implementations, the blocks and sub blocks in FIG. 1B are assigned a unique identifier by a random identifier generation logic. Connectors and arrows may determine the interconnections of hierarchical objects, and sub blocks within blocks may be identified by appending a block identifier and a sub block identifier.

The technical architecture diagram may be a digital image represented by a digital file (e.g., an image file) and, when processing the input data identifying the technical architecture diagram, the augmenter platform may identify graphical images, text, and/or the like as hierarchical objects of the technical architecture diagram. In this case, the augmenter platform may identify a hierarchical order of the hierarchical objects that corresponds to hierarchical relationships among the hierarchical objects. As an example, the augmenter platform may identify, in a technical architecture diagram about analysis of social media information, components including an icon identifying a first social media platform, an icon identifying a second social media platform, and an icon identifying a third social media platform. In this example, the hierarchical objects may include an object associated with social media platforms in general, an object (e.g., an icon) associated with the first social media platform, an object (e.g., an icon) associated with the second social media platform, and an object (e.g., an icon) associated with the third social media platform. The hierarchical order of the hierarchical objects may identify the object associated with social media platforms as a parent object of the object associated with the first social media platform, the object associated with the second social media platform, and the object associated with the third social media platform.

When processing the input data with the deep learning model, the augmenter platform may identify a title of an architecture associated with (e.g., represented by) the technical architecture diagram, a quantity of components and sub-components in the technical architecture diagram, a legend in the technical architecture diagram, and/or the like. Additionally, or alternatively, the augmenter platform may identify (e.g., by applying a recursive process) arrows, connectors, icons, interconnections, source systems, target systems, and/or the like represented by the technical architecture diagram.

The augmenter platform may train the deep learning model with historical data (e.g., historical data identifying icons, interconnections, legends, and/or the like) to identify hierarchical objects. For example, the augmenter platform may train the deep learning model in a manner similar to the manner described below in connection with FIG. 2. The augmenter platform may train the deep learning model with historical icon data identifying icons in historical technical architecture diagrams, historical interconnection (e.g., connector) data identifying interconnections in the historical technical architecture diagrams, historical legend data identifying legends in the historical technical architecture diagrams, and/or the like.

Alternatively, rather than training the deep learning model, the augmenter platform may obtain the deep learning model from another system or device that trained the deep learning model. In this case, the other system or device may obtain the historical data for use in training the deep learning model, and may periodically receive additional data that the other system or device may use to retrain the deep learning model in order to update the deep learning model.

The augmenter platform may process the input data, using the deep learning model, to determine hierarchical objects from the technical architecture diagram and a hierarchical order of the hierarchical objects. The augmenter platform may use the deep learning model to process the input data in a manner similar to the manner described below in connection with FIG. 3. When processing the input data identifying the technical architecture diagram, the augmenter platform may convert the input data identifying the technical architecture diagram into formatted data in a format compatible with the deep learning model, and may process the formatted data, with the deep learning model, to determine the hierarchical objects from the technical architecture diagram.

Figure 1C:
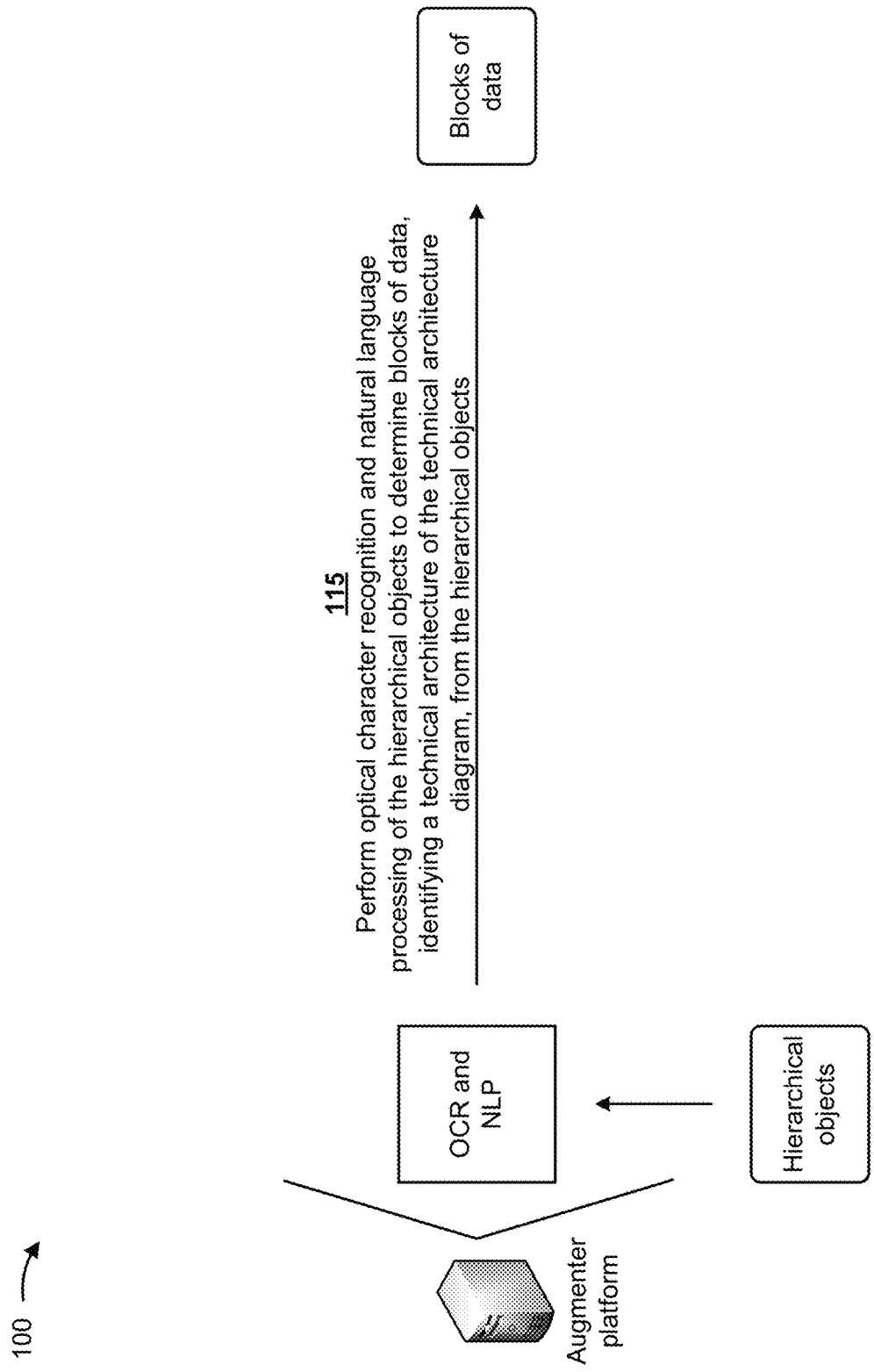

As shown in FIG. 1C, and by reference number 115, the augmenter platform may perform optical character recognition and natural language processing of the hierarchical objects to determine blocks of data, identifying a technical architecture of the technical architecture diagram, from the hierarchical objects. The blocks of data may include text provided in the hierarchical objects of the technical architecture diagram. The blocks of data may be provided in a particular format (e.g., a JavaScript Object Notation (JSON) format).

Optical character recognition (OCR) involves a conversion of images of typed, handwritten, or printed text into machine-encoded text. For example, OCR may be applied to a scanned document, a photo of a document, a photo of a scene that includes text, and/or the like, to produce electronic data (e.g., plain text data). Converting printed text to electronic data allows the information represented by the printed text to be electronically edited, searched, stored more compactly, displayed online, and/or used in machine processes such as cognitive computing, machine translation, (determined) text-to-speech, key data and text mining, and/or the like.

Natural language processing (NLP) involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic determination, named entity recognition, parts-of-speech tagging, relationship determination, stemming, and/or the like.

In some implementations, the augmenter platform utilizes deep learning, a recurrent neural Network (RNN), a long short-term memory (LSTM) network, and/or the like to perform the optical character recognition and/or natural language processing. For example, the augmenter platform may perform the optical character recognition and/or natural language processing using Tesseract (e.g., PyTesserarct), OpenCV, and/or the like.

Figure 1D:
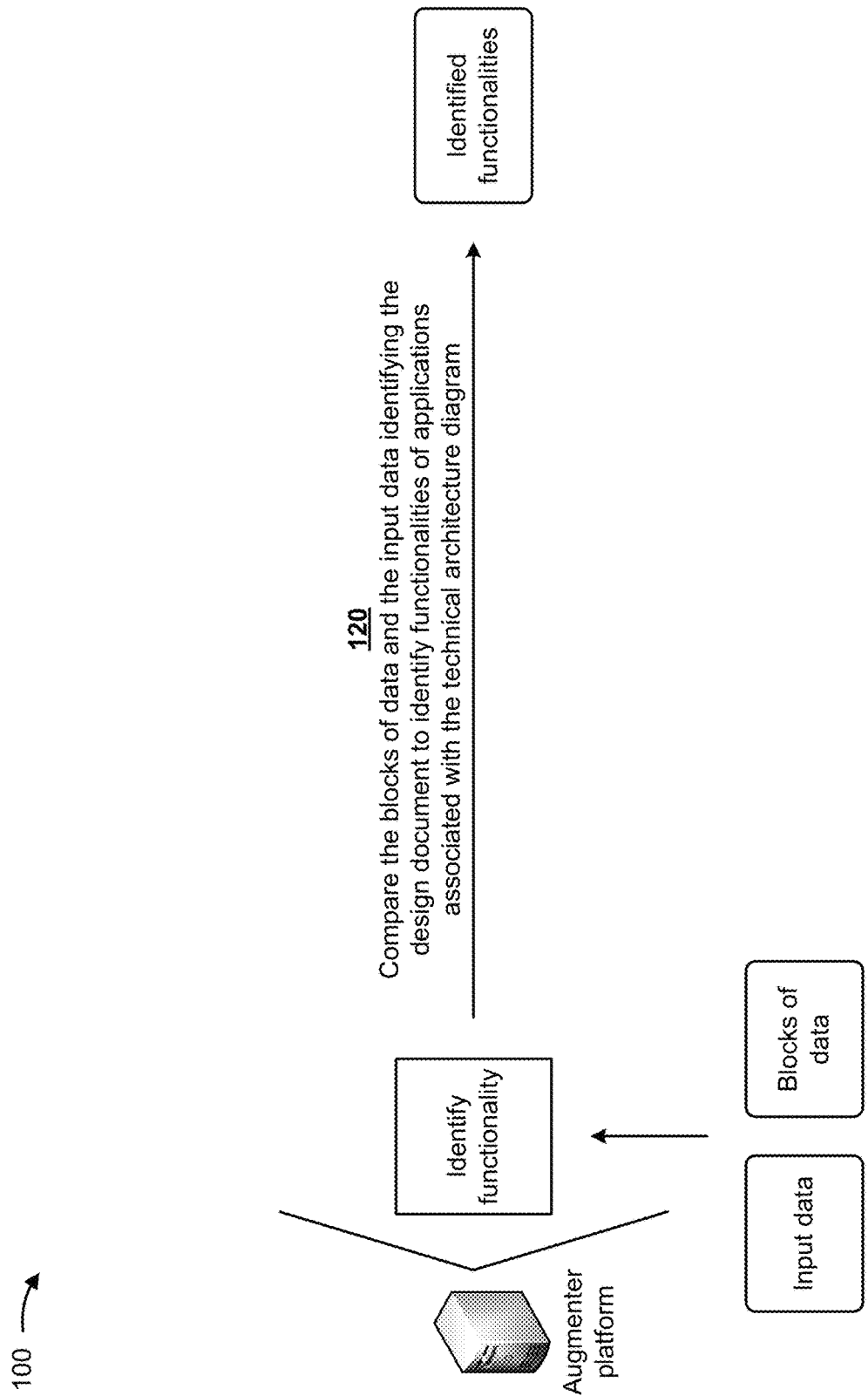

As shown in FIG. 1D, and by reference number 120, the augmenter platform may compare the blocks of data and the input data identifying the design document to identify functionalities of applications associated with the technical architecture diagram. For example, the augmenter platform may identify an application related to the architecture associated with the technical architecture diagram, and may search the design document related to the application to identify functionalities of the application. If the blocks of data are in a particular format (e.g., a JSON format created by the augmenter platform), a block of data may be associated with the application (e.g., via a tag "Application Name: Social Media") and the augmenter platform may create a functionality tag for the block of data based on a functionality of the application (e.g., a functionality tag indicating "Functionality: Holds various social media information"). The augmenter platform may search the design document to identify functionalities for all of the applications associated with the technical architecture diagram.

Figure 1E:
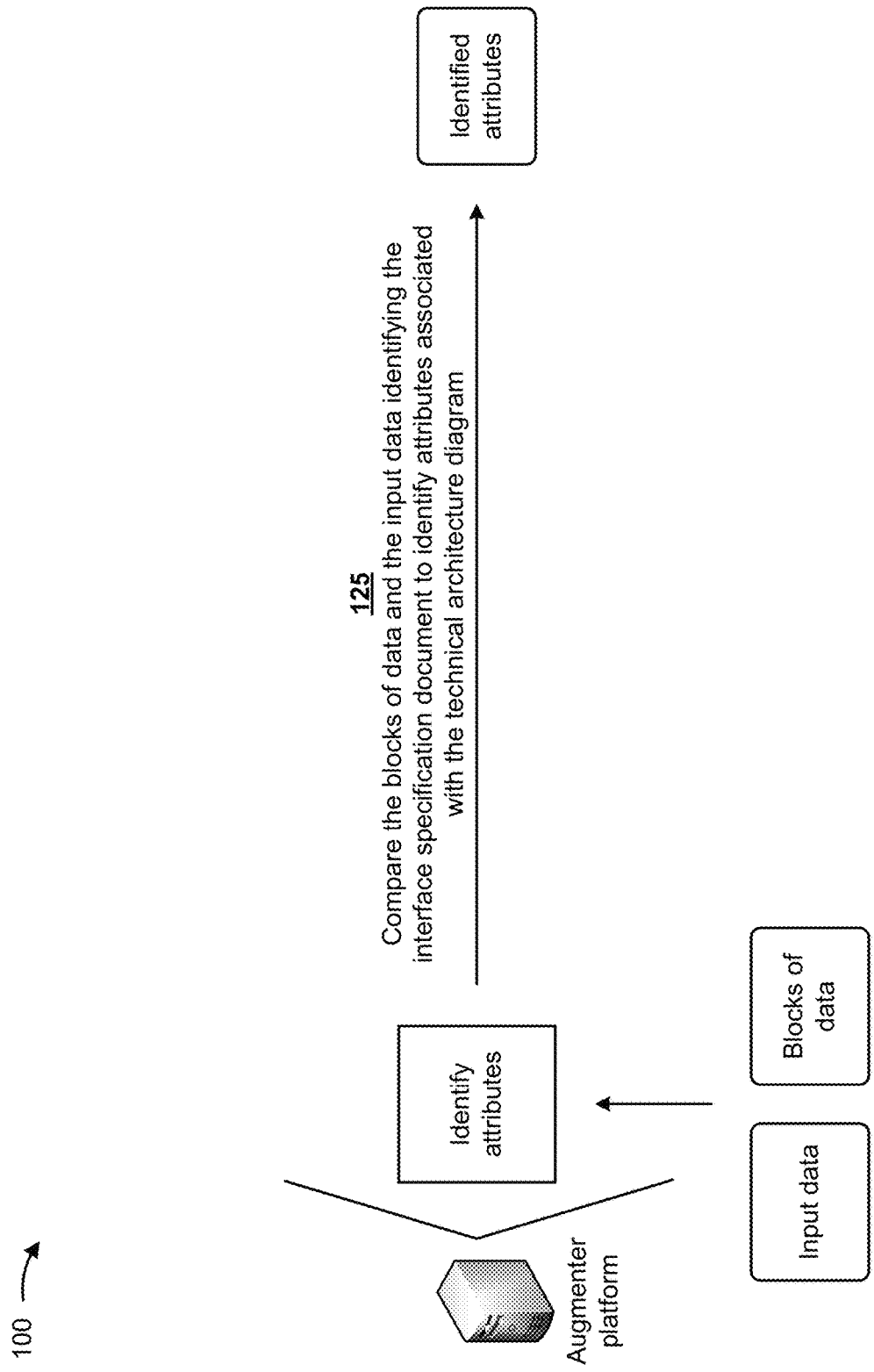

As shown in FIG. 1E, and by reference number 125, the augmenter platform may compare the blocks of data and the input data identifying the interface specification document to identify attributes associated with the technical architecture diagram. For example, the augmenter platform may determine the attributes from a particular interface specification document (e.g., an end-to-end interface specification document that maps source data to target data using a table data structure). If the blocks of data are in a particular format (e.g., a JSON format created by the augmenter platform), the augmenter platform may create an attribute tag for the block of data based on the identified attribute. Additionally, the augmenter platform may create a source system tag, a source system identifier tag, a target system tag, a target system identifier tag, and/or the like for the block of data based on the attributes associated with the technical architecture diagram.

Figure 1F:
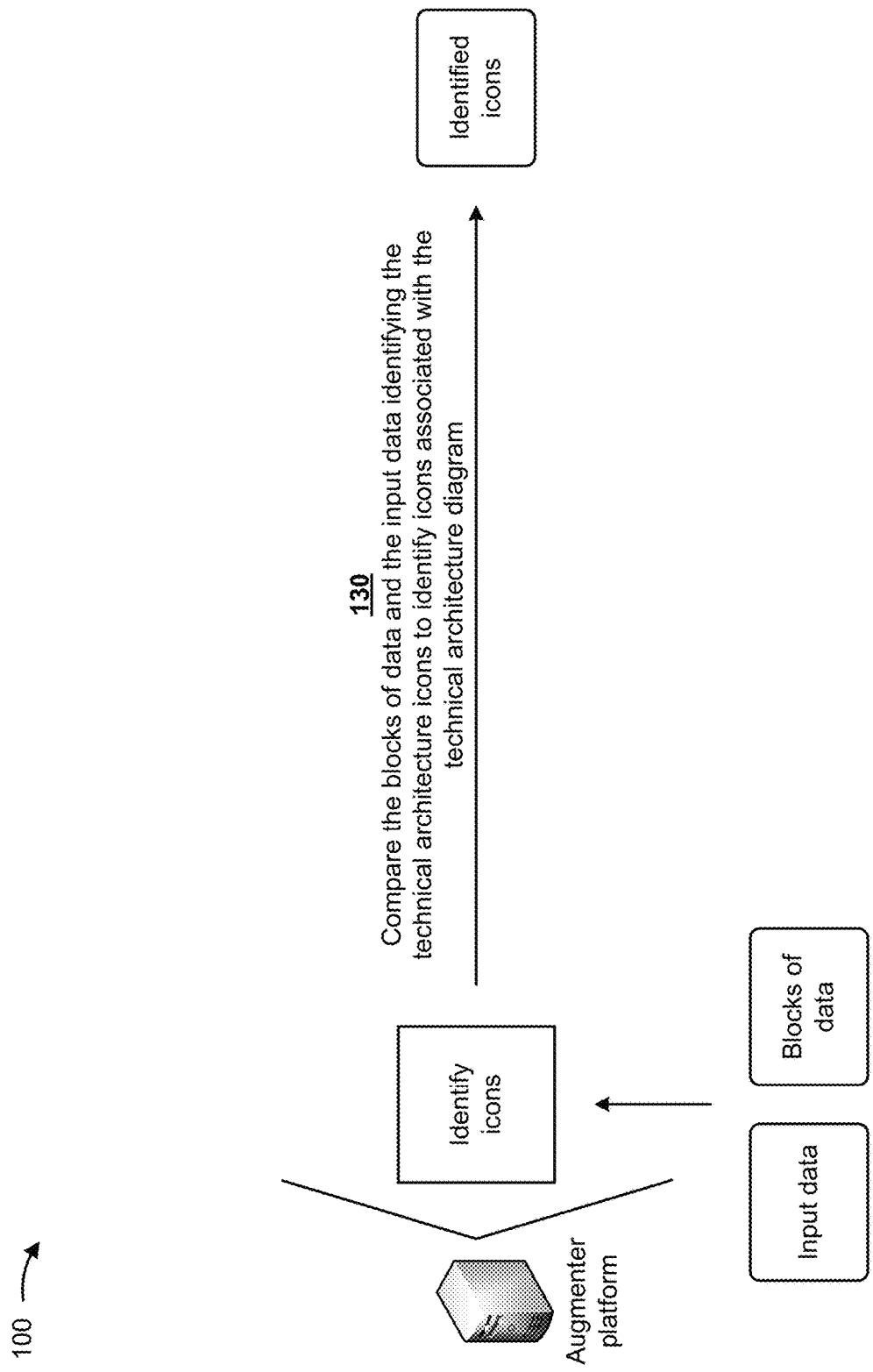

As shown in FIG. 1F, and by reference number 130, the augmenter platform may compare the blocks of data and the input data identifying the technical architecture icons (e.g., which may be stored in the augmenter platform and not received via the input data) to identify icons associated with the technical architecture diagram. The augmenter platform may validate the identified icons by comparing the identified icons with icons stored in a repository of technical architecture icons. For example, the augmenter platform may compare information associated with an icon identified in a block of data with information stored in the repository, and may match the icon in the block of data to an icon stored in the repository based on comparing the information associated with the icon identified in the block of data with the information stored in the repository. If the icon in the block of data does not match the icon stored in the repository, the augmenter platform may replace the icon in the block of data with an appropriate icon from the repository. For example, if the block of data relates to data storage and the icon in the block of data includes a system icon, the augmenter platform may replace the system icon with a data storage icon provided in the repository.

Figure 1G:
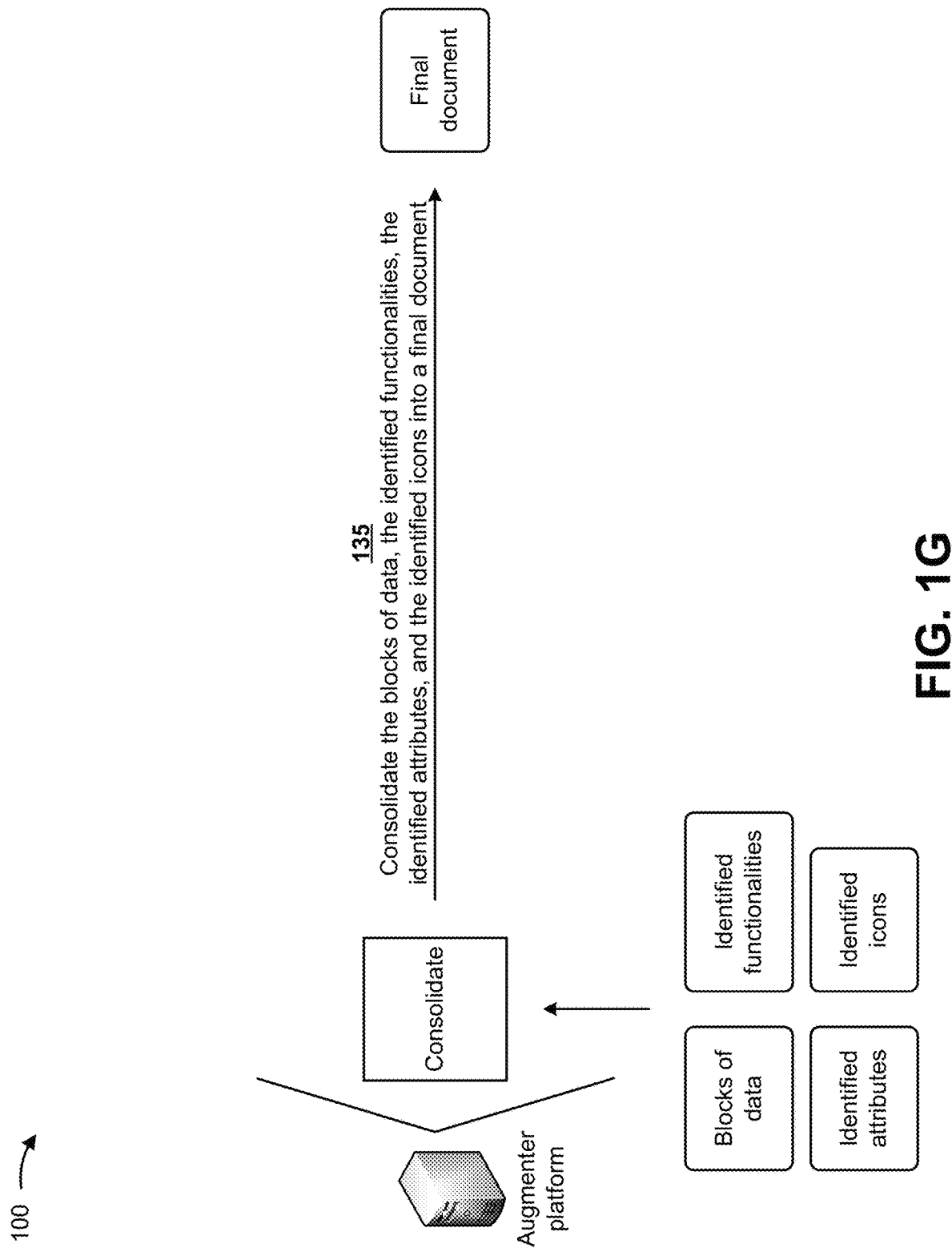

As shown in FIG. 1G, and by reference number 135, the augmenter platform may consolidate the blocks of data, the identified functionalities, the identified attributes, and the identified icons into a final document. In some implementations, the final document may be provided in a particular format (e.g., a JSON format). For example, the augmenter platform may consolidate the blocks of data, the identified functionalities of the applications, the identified attributes, and the identified icons based on the hierarchical order of the hierarchical objects from which the blocks of data, the identified functionalities, the identified attributes, and the identified icons are derived. In another example, the augmenter platform may combine the blocks of data (e.g., in the JSON format), the identified functionalities, the identified attributes, and the identified icons, in a final JSON format file.

As shown in FIG. 1H, and by reference number 140, the augmenter platform may perform one or more actions based on the final document. The one or more actions may include the augmenter platform generating an interactive technical architecture diagram based on the final document (e.g., the interactive technical architecture diagram may be created using D3.js and Python based on an input consolidated JSON file). For example, the augmenter platform may generate a diagram, based on the technical architecture diagram, that allows a user to interact with items in the diagram. The interactive technical architecture diagram may allow a user to hover (e.g., position a mouse) over items to cause information about the item to be displayed. In this way, the augmenter platform may conserve human resources, computing resources, networking resources, and/or the like that would otherwise have been wasted correlating the technical architecture diagram with the design document, the interface specification document, and/or the like.

The one or more actions may include the augmenter platform generating a technical architecture summary document based on the final document. For example, the augmenter platform may generate a technical architecture summary document based on the blocks of data determined from the hierarchical objects of the technical architecture diagram, the identified functionalities, the identified attributes, and the identified icons. The augmenter platform may provide, for display, the technical architecture summary document in conjunction with or separately from the interactive technical architecture diagram. In this way, the augmenter platform may enable a user of the interactive technical architecture diagram to quickly and easily access further information about the technical architecture diagram from the technical architecture summary document (e.g., when the user is interacting with the interactive technical architecture diagram).

The one or more actions may include the augmenter platform generating data identifying the attributes based on the final document. For example, the augmenter platform may generate data that identifies data flows and relationships between components of the technical architecture, may cause the data identifying the data flows and relationships to be displayed in the interactive technical architecture diagram, and/or the like. In this way, the augmenter platform may enable a user to understand the data flows and relationships among the components of the technical architecture diagram, thereby conserving resources (e.g., human resources, computing resources, networking resources, and/or the like) that would otherwise have been wasted attempting to determine and understand relationships among the components of the technical architecture diagram.

The one or more actions may include the augmenter platform generating snippets for the technical architecture diagram based on the final document. For example, the augmenter platform may generate snippets associated with corresponding components of the technical architecture diagram, and may display the snippets in the interactive technical architecture diagram based on input from the user (e.g., hovering over an item associated with a component of the technical architecture). In this way, the augmenter platform may enable a user to quickly and easily access information related to particular components of the technical architecture, thereby conserving resources that would otherwise have been wasted attempting to determine and understand functions performed by the components of the technical architecture diagram.

The one or more actions may include the augmenter platform providing the final document to a client device. For example, the client device may receive the final document, and may utilize the final document to generate an interactive technical architecture diagram as described above, to generate a technical architecture summary document as described above, and/or the like. In this way, the augmenter platform may enable a user of the client device to utilize the final document, the interactive technical architecture diagram, the technical architecture summary document, and/or the like. This, in turn, may conserve human resources, computing resources, networking resources, and/or the like that would otherwise have been wasted attempting to determine and understand the technical architecture diagram.

The one or more actions may include the augmenter platform retraining the deep learning model based on the final document. In this way, the augmenter platform may improve the accuracy of the deep learning model in processing the input data identifying the technical architecture diagram to determine hierarchical objects from the technical architecture diagram and a hierarchical order of the hierarchical objects. This, in turn, may improve speed and efficiency of the deep learning model, and thereby conserve computing resources, networking resources, and/or the like.

Figure 1I:
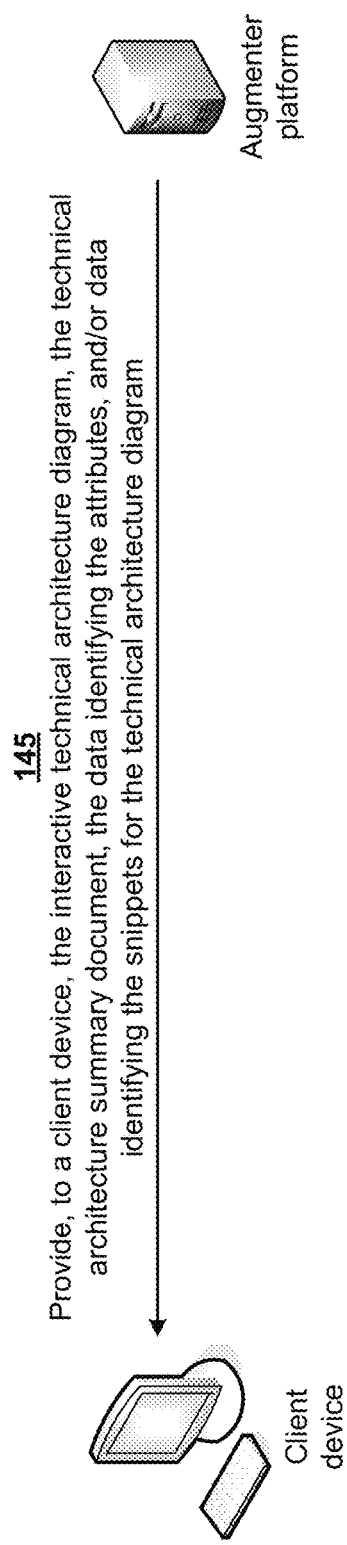

As shown in FIG. 1I, and by reference number 145, the augmenter platform may provide, to a client device, the interactive technical architecture diagram, the technical architecture summary document, the data identifying the attributes, and/or data identifying the snippets for the technical architecture diagram. In this way, the augmenter platform may enable a user of the client device to utilize the interactive technical architecture diagram, the technical architecture summary document, the data identifying the attributes, and/or the data identifying the snippets in order to quickly and easily understand the technical architecture diagram. The augmenter platform may provide the interactive technical architecture diagram, the technical architecture summary document, the data identifying the attributes, and/or data identifying the snippets for the technical architecture diagram to multiple client devices, thereby enabling multiple users associated with a same technical architecture to utilize the interactive technical architecture diagram, the technical architecture summary document, the data identifying the attributes, and/or the data identifying the snippets in order to quickly and easily understand the technical architecture diagram.

Figure 1J:
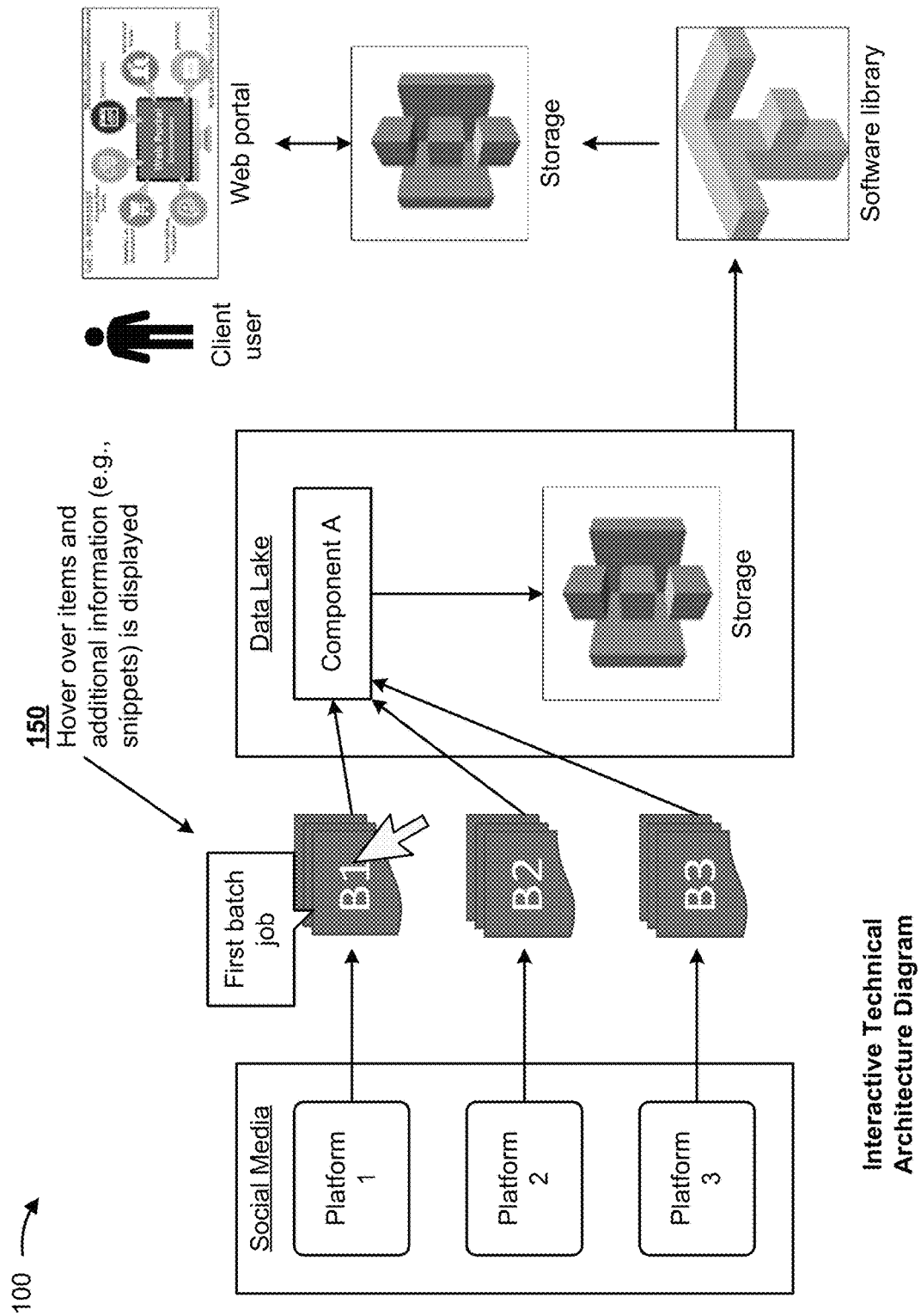

As shown in FIG. 1J, the augmenter platform and/or client device may provide the interactive technical architecture diagram for display to a user via a user interface. For example, the user may utilize the augmenter platform and/or the client device to interact with the interactive technical architecture diagram. As shown by reference number 150, the augmenter platform and/or the client device may enable a user to hover over items of the interactive technical architecture diagram, and the augmenter platform may display additional information (e.g., snippets) related to the items. The augmenter platform may receive one or more changes (e.g., via the client device) from the user based on interacting with the interactive technical architecture diagram. In this case, the augmenter platform may modify the interactive technical architecture diagram based on the one or more changes, and may generate a modified interactive technical architecture diagram.

Figure 1K:
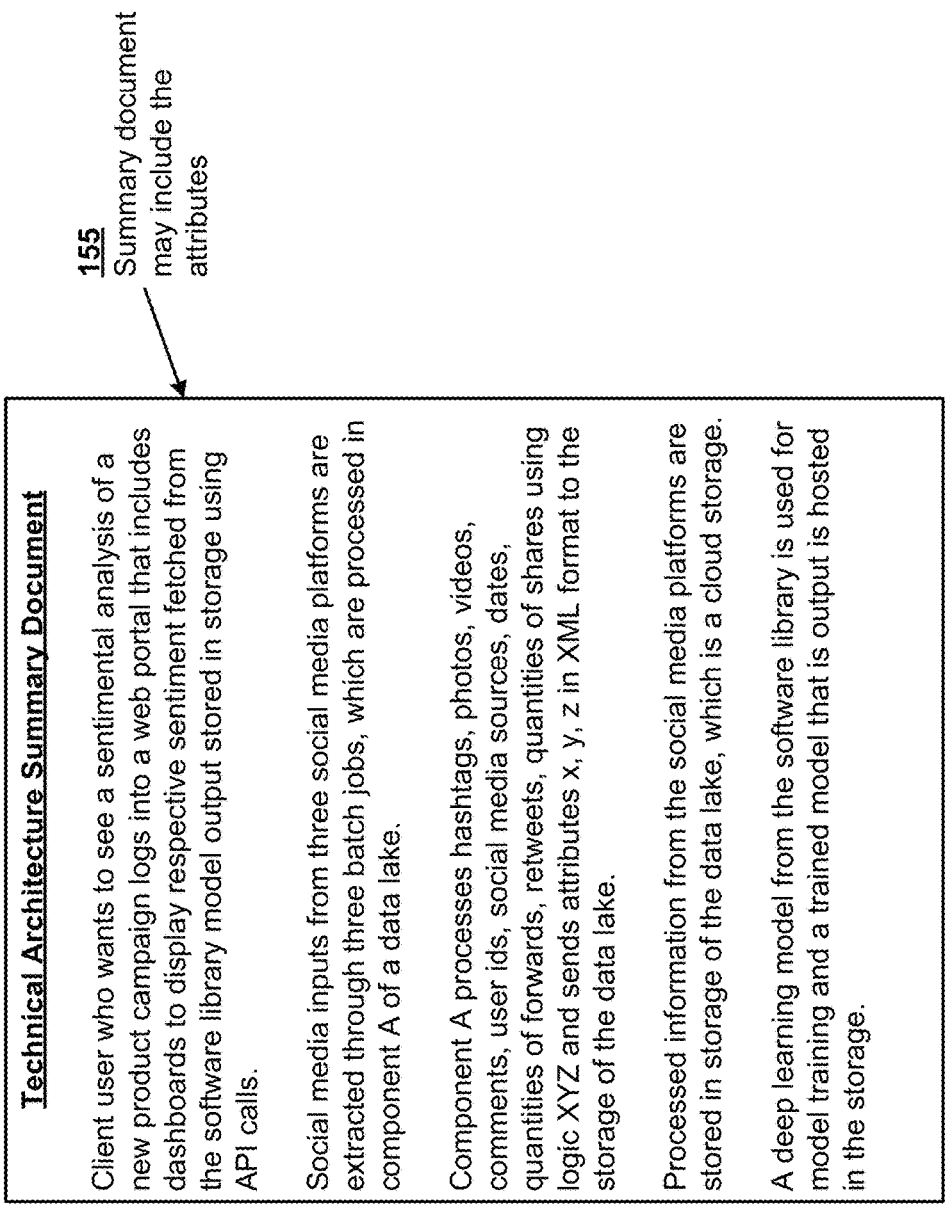

As shown in FIG. 1K, the augmenter platform and/or the client device may provide a technical architecture summary document for display to a user via a user interface. For example, the augmenter platform may generate, based on the final document, a technical architecture summary document that provides a description of functional components of the technical architecture diagram. As shown by reference number 155, the summary document may include the attributes associated with the technical architecture diagram, as described above.

Figure 1L:
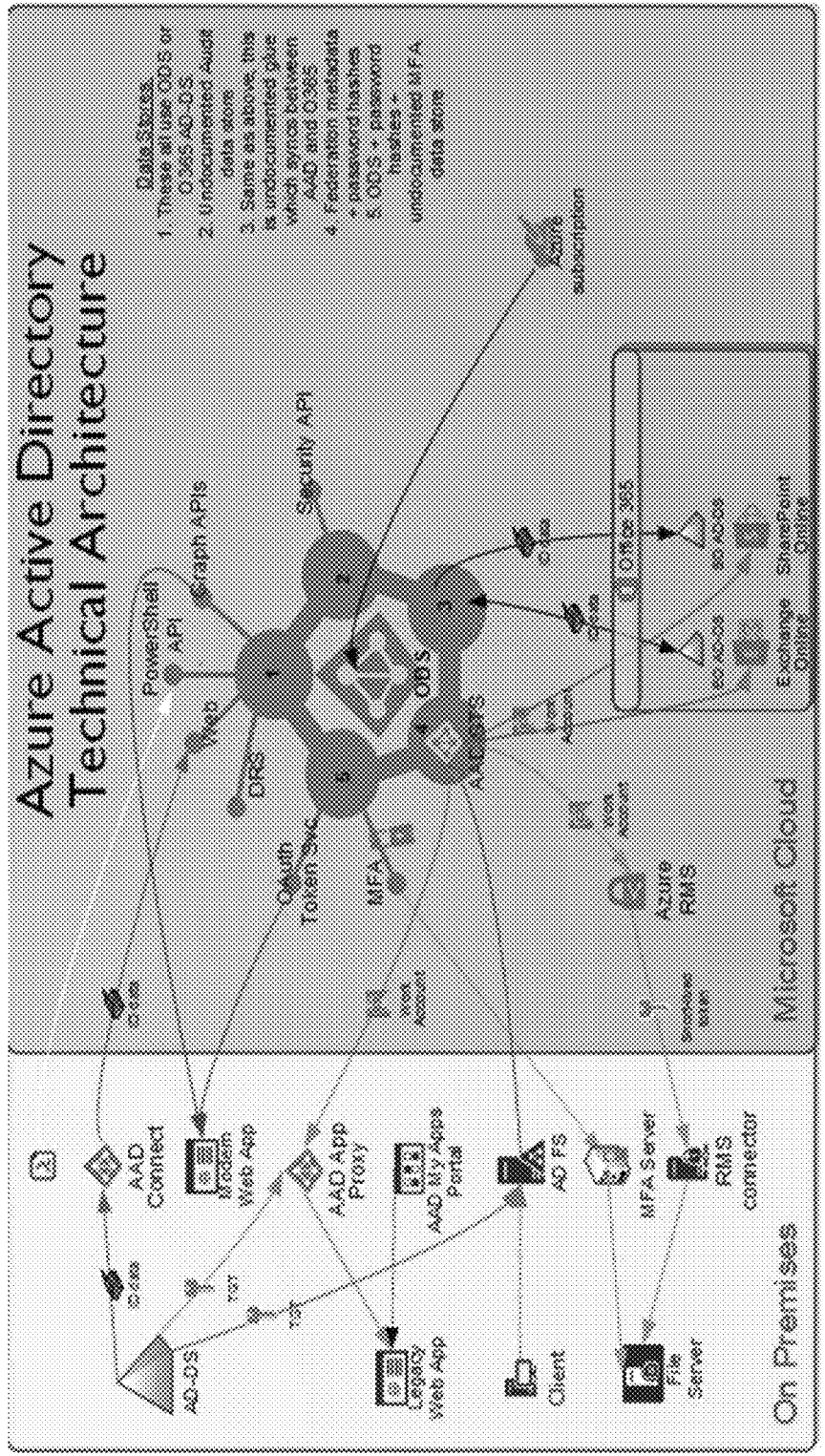

As shown in FIG. 1L, and by reference number 165, an example technical architecture diagram may include a diagram for a complex technical architecture, such as an architecture of an Azure active directory. The Azure active directory technical architecture diagram may include a title (e.g., "Azure Active Directory Technical Architecture") and a legend (e.g., "Data Stores" with information identifying five data stores). Additionally, the Azure active directory technical architecture diagram may include multiple icons (e.g., a Cloud icon, ID data icon, an Azure subscription icon, an Exchange Online icon, a SharePoint Online icon, and/or the like). Additionally, the Azure active directory technical architecture diagram may include arrows and connectors provided between the multiple icons (e.g., red arrows between AD-DS, AD FS, AAD/STS, Exchange Online, and SharePoint Online icons).

In this way, several different stages of the process for converting a technical architecture diagram into an interactive technical architecture diagram are automated, via deep learning and natural language processing, which may remove human subjectivity and waste from the process, and which may improve speed and efficiency of the process and conserve computing resources (e.g., processing resources, memory resources, communication resources, and/or the like), networking resources, human resources, resources costs (as discussed herein), and/or the like. Furthermore, implementations described herein use a rigorous, computerized process to perform tasks or roles that were not previously performed or were previously performed using subjective human intuition or input. For example, currently there does not exist a technique that utilizes deep learning and natural language processing to convert a technical architecture diagram into an interactive technical architecture diagram in the manner described herein. Finally, the process for utilizing deep learning and natural language processing to convert a technical architecture diagram into an interactive technical architecture diagram conserves computing resources, networking resources, and/or the like that have would otherwise have been used to correlate the technical architecture diagrams with the design documents, the interface specification documents, and/or the like, incorrectly modify the technical architecture documents based on misunderstandings of the technical architecture documents, correct the incorrectly modified technical architecture documents, and/or the like.

As indicated above, FIGS. 1A-1L are provided merely as examples. Other examples may differ from what is described with regard to FIGS. 1A-1L.

Figure 2:
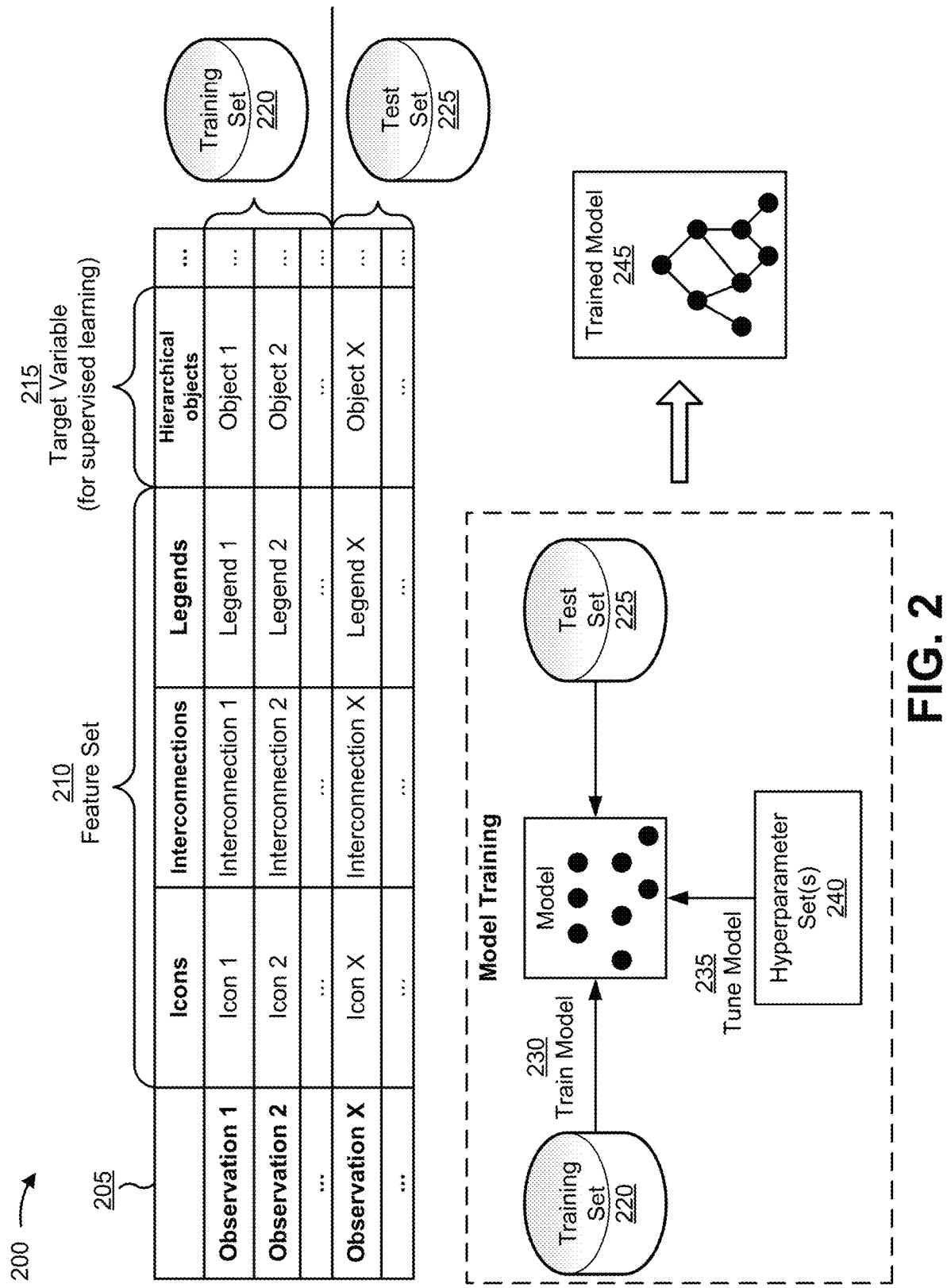
FIG. 2 is a diagram illustrating an example of training a deep learning model.

FIG. 2 is a diagram illustrating an example 200 of training a deep learning model in connection with utilizing deep learning and natural language processing to convert a technical architecture diagram into an interactive technical architecture diagram. The deep learning model training described herein may be performed using a deep learning system. The deep learning system may include or may be included in a computing device, a server, a cloud computing environment, and/or the like, such as the augmenter platform described in more detail below.

As shown by reference number 205, a deep learning model may be trained using a set of observations. The set of observations may be obtained and/or input from historical data, such as data gathered during one or more processes described herein. For example, the set of observations may include data gathered from server devices, as described elsewhere herein. In some implementations, the deep learning system may receive the set of observations (e.g., as input) from server devices and/or client devices.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the deep learning system may determine variable values for a specific observation based on input received from server devices and/or client devices. For example, the deep learning system may identify a feature set (e.g., one or more features and/or corresponding feature values) from structured data input to the deep learning system, such as by extracting data from a particular column of a table, extracting data from a particular field of a form, extracting data from a particular field of a message, extracting data received in a structured data format, and/or the like. In some implementations, the deep learning system may determine features (e.g., variables types) for a feature set based on input received from server devices and/or client devices, such as by extracting or generating a name for a column, extracting or generating a name for a field of a form and/or a message, extracting or generating a name based on a structured data format, and/or the like. Additionally, or alternatively, the deep learning system may receive input from an operator to determine features and/or feature values. In some implementations, the deep learning system may perform natural language processing and/or another feature identification technique to extract features (e.g., variable types) and/or feature values (e.g., variable values) from text (e.g., unstructured data) input to the deep learning system, such as by identifying keywords and/or values associated with those keywords from the text.

As an example, a feature set for a set of observations may include a first feature of icons, a second feature of interconnections, a third feature of legends, and so on. As shown, for a first observation, the first feature may have a value of icon 1, the second feature may have a value of interconnection 1, the third feature may have a value of legend 1, and so on. These features and feature values are provided as examples, and may differ in other examples. For example, the feature set may include one or more of the following features: icons utilized in technical architecture diagrams, interconnections utilized in technical architecture diagrams, legends utilized in technical architecture diagrams, titles utilized in technical architecture diagrams. In some implementations, the deep learning system may pre-process and/or perform dimensionality reduction to reduce the feature set and/or combine features of the feature set to a minimum feature set. A deep learning model may be trained on the minimum feature set, thereby conserving resources of the deep learning system (e.g., processing resources, memory resources, and/or the like) used to train the deep learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is hierarchical objects, which has a value of object 1 for the first observation.

The target variable may represent a value that a deep learning model is being trained to predict, and the feature set may represent the variables that are input to a trained deep learning model to predict a value for the target variable. The set of observations may include target variable values so that the deep learning model can be trained to recognize patterns in the feature set that lead to a target variable value. A deep learning model that is trained to predict a target variable value may be referred to as a supervised learning model, a predictive model, and/or the like. When the target variable type is associated with continuous target variable values (e.g., a range of numbers and/or the like), the deep learning model may employ a regression technique. When the target variable type is associated with categorical target variable values (e.g., classes, labels, and/or the like), the deep learning model may employ a classification technique.

In some implementations, the deep learning model may be trained on a set of observations that do not include a target variable (or that include a target variable, but the deep learning model is not being executed to predict the target variable). This may be referred to as an unsupervised learning model, an automated data analysis model, an automated signal extraction model, and/or the like. In this case, the deep learning model may learn patterns from the set of observations without labeling or supervision, and may provide output that indicates such patterns, such as by using clustering and/or association to identify related groups of items within the set of observations.

As further shown, the deep learning system may partition the set of observations into a training set 220 that includes a first subset of observations, of the set of observations, and a test set 225 that includes a second subset of observations of the set of observations. The training set 220 may be used to train (e.g., fit, tune, and/or the like) the deep learning model, while the test set 225 may be used to evaluate a deep learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the deep learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the deep learning system may randomly select observations to be included in the training set 220 and/or the test set 225.

As shown by reference number 230, the deep learning system may train a deep learning model using the training set 220. This training may include executing, by the deep learning system, a deep learning algorithm to determine a set of model parameters based on the training set 220. In some implementations, the deep learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the deep learning algorithm may include a decision tree algorithm, which may include a tree ensemble algorithm (e.g., generated using bagging and/or boosting), a random forest algorithm, a boosted trees algorithm, and/or the like. A model parameter may include an attribute of a deep learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the deep learning system may use one or more hyperparameter sets 240 to tune the deep learning model. A hyperparameter may include a structural parameter that controls execution of a deep learning algorithm by the deep learning system, such as a constraint applied to the deep learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the deep learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a deep learning model, the deep learning system may identify a set of deep learning algorithms to be trained (e.g., based on operator input that identifies the one or more deep learning algorithms, based on random selection of a set of deep learning algorithms, and/or the like), and may train the set of deep learning algorithms (e.g., independently for each deep learning algorithm in the set) using the training set 220. The deep learning system may tune each deep learning algorithm using one or more hyperparameter sets 240 (e.g., based on operator input that identifies hyperparameter sets 240 to be used, based on randomly generating hyperparameter values, and/or the like). The deep learning system may train a particular deep learning model using a specific deep learning algorithm and a corresponding hyperparameter set 240. In some implementations, the deep learning system may train multiple deep learning models to generate a set of model parameters for each deep learning model, where each deep learning model corresponds to a different combination of a deep learning algorithm and a hyperparameter set 240 for that deep learning algorithm.

In some implementations, the deep learning system may perform cross-validation when training a deep learning model. Cross validation can be used to obtain a reliable estimate of deep learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the deep learning system may train a deep learning model on the training groups and then test the deep learning model on the hold-out group to generate a cross-validation score. The deep learning system may repeat this training procedure using different hold-out groups and different test groups to generate a cross-validation score for each training procedure. In some implementations, the deep learning system may independently train the deep learning model k times, with each individual group being used as a hold-out group once and being used as a training group k−1 times. The deep learning system may combine the cross-validation scores for each training procedure to generate an overall cross-validation score for the deep learning model. The overall cross-validation score may include, for example, an average cross-validation score (e.g., across all training procedures), a standard deviation across cross-validation scores, a standard error across cross-validation scores, and/or the like.

In some implementations, the deep learning system may perform cross-validation when training a deep learning model by splitting the training set into a number of groups (e.g., based on operator input that identifies the number of groups, based on randomly selecting a number of groups, and/or the like). The deep learning system may perform multiple training procedures and may generate a cross-validation score for each training procedure. The deep learning system may generate an overall cross-validation score for each hyperparameter set 240 associated with a particular deep learning algorithm. The deep learning system may compare the overall cross-validation scores for different hyperparameter sets 240 associated with the particular deep learning algorithm, and may select the hyperparameter set 240 with the best (e.g., highest accuracy, lowest error, closest to a desired threshold, and/or the like) overall cross-validation score for training the deep learning model. The deep learning system may then train the deep learning model using the selected hyperparameter set 240, without cross-validation (e.g., using all of data in the training set 220 without any hold-out groups), to generate a single deep learning model for a particular deep learning algorithm. The deep learning system may then test this deep learning model using the test set 225 to generate a performance score, such as a mean squared error (e.g., for regression), a mean absolute error (e.g., for regression), an area under receiver operating characteristic curve (e.g., for classification), and/or the like. If the deep learning model performs adequately (e.g., with a performance score that satisfies a threshold), then the deep learning system may store that deep learning model as a trained deep learning model 245 to be used to analyze new observations, as described below in connection with FIG. 3.

In some implementations, the deep learning system may perform cross-validation, as described above, for multiple deep learning algorithms (e.g., independently), such as a regularized regression algorithm, different types of regularized regression algorithms, a decision tree algorithm, different types of decision tree algorithms, and/or the like. Based on performing cross-validation for multiple deep learning algorithms, the deep learning system may generate multiple deep learning models, where each deep learning model has the best overall cross-validation score for a corresponding deep learning algorithm. The deep learning system may then train each deep learning model using the entire training set 220 (e.g., without cross-validation), and may test each deep learning model using the test set 225 to generate a corresponding performance score for each deep learning model. The deep learning model may compare the performance scores for each deep learning model, and may select the deep learning model with the best (e.g., highest accuracy, lowest error, closest to a desired threshold, and/or the like) performance score as the trained deep learning model 245.

As indicated above, FIG. 2 is provided as an example. Other examples may differ from what is described in connection with FIG. 2. For example, the deep learning model may be trained using a different process than what is described in connection with FIG. 2. Additionally, or alternatively, the deep learning model may employ a different deep learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
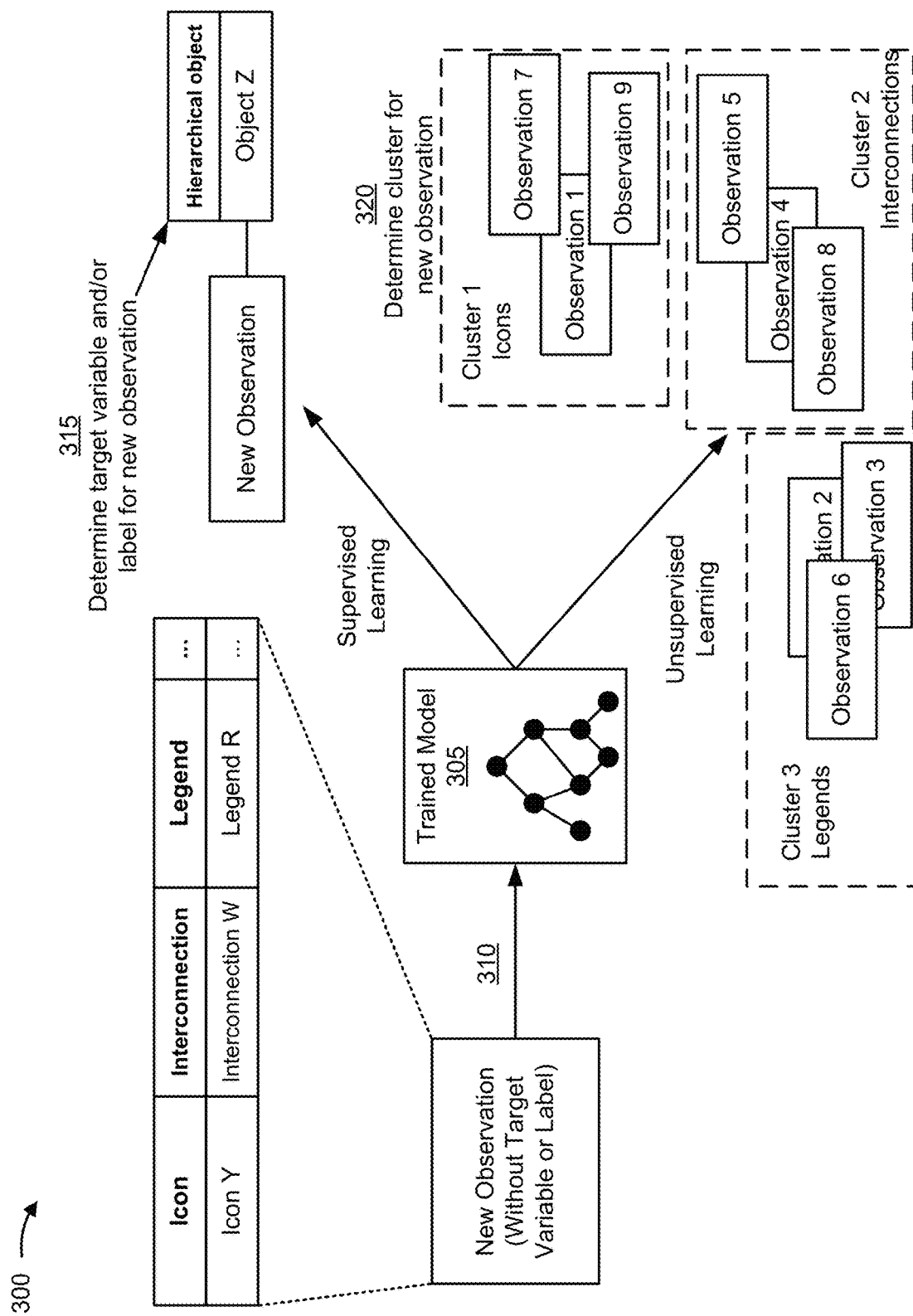
FIG. 3 is a diagram illustrating an example of applying a trained deep learning model to a new observation.

FIG. 3 is a diagram illustrating an example 300 of applying a trained deep learning model to a new observation. The new observation may be input to a deep learning system that stores a trained deep learning model 305. In some implementations, the trained deep learning model 305 may be the trained deep learning model 245 described above in connection with FIG. 2. The deep learning system may include or may be included in a computing device, a server, a cloud computing environment, and/or the like, such as the augmenter platform.

As shown by reference number 310, the deep learning system may receive a new observation (or a set of new observations), and may input the new observation to the deep learning model 305. As shown, the new observation may include a first feature of an icon, a second feature of an interconnection, a third feature of a legend, and so on, as an example. The deep learning system may apply the trained deep learning model 305 to the new observation to generate an output (e.g., a result). The type of output may depend on the type of deep learning model and/or the type of deep learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the deep learning model and/or observations used to train the deep learning model), and/or the like, such as when unsupervised learning is employed.

In some implementations, the trained deep learning model 305 may predict a value of object Z for the target variable of a hierarchical object for the new observation, as shown by reference number 315. Based on this prediction (e.g., based on the value having a particular label or classification, based on the value satisfying or failing to satisfy a threshold, and/or the like), the deep learning system may provide a recommendation and/or output for determination of a recommendation, such as the hierarchical object is an interconnection, a component, a title, and/or the like of the technical architecture diagram. Additionally, or alternatively, the deep learning system may perform an automated action and/or may cause an automated action to be performed (e.g., by instructing another device to perform the automated action), such as creating the hierarchical object Z based on the target variable. As another example, if the deep learning system were to predict a value of object A for the target variable of the hierarchical object, then the deep learning system may provide a different recommendation (e.g., the hierarchical object is a legend of the technical architecture diagram) and/or may perform or cause performance of a different automated action (e.g., creating hierarchical object A). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained deep learning model 305 may classify (e.g., cluster) the new observation in a cluster, as shown by reference number 320. The observations within a cluster may have a threshold degree of similarity. As an example, if the deep learning system classifies the new observation in a first cluster (e.g., icons), then the deep learning system may provide a first recommendation, such as the hierarchical object is an icon. Additionally, or alternatively, the deep learning system may perform a first automated action and/or may cause a first automated action to be performed (e.g., by instructing another device to perform the automated action) based on classifying the new observation in the first cluster, such as generating an icon hierarchical object. As another example, if the deep learning system were to classify the new observation in a second cluster (e.g., interconnections), then the deep learning system may provide a second (e.g., different) recommendation (e.g., the hierarchical object is an interconnection) and/or may perform or cause performance of a second (e.g., different) automated action, such as generating an interconnection for the hierarchical object.

In this way, the deep learning system may apply a rigorous and automated process to convert a technical architecture diagram into an interactive technical architecture diagram. The deep learning system enables recognition and/or identification of tens, hundreds, thousands, or millions of features and/or feature values for tens, hundreds, thousands, or millions of observations, thereby increasing accuracy and consistency and reducing delay associated with converting a technical architecture diagram into an interactive technical architecture diagram relative to requiring computing resources to be allocated for tens, hundreds, or thousands of operators to convert a technical architecture diagram into an interactive technical architecture diagram using the features or feature values.

As indicated above, FIG. 3 is provided as an example. Other examples may differ from what is described in connection with FIG. 3.

Figure 4:
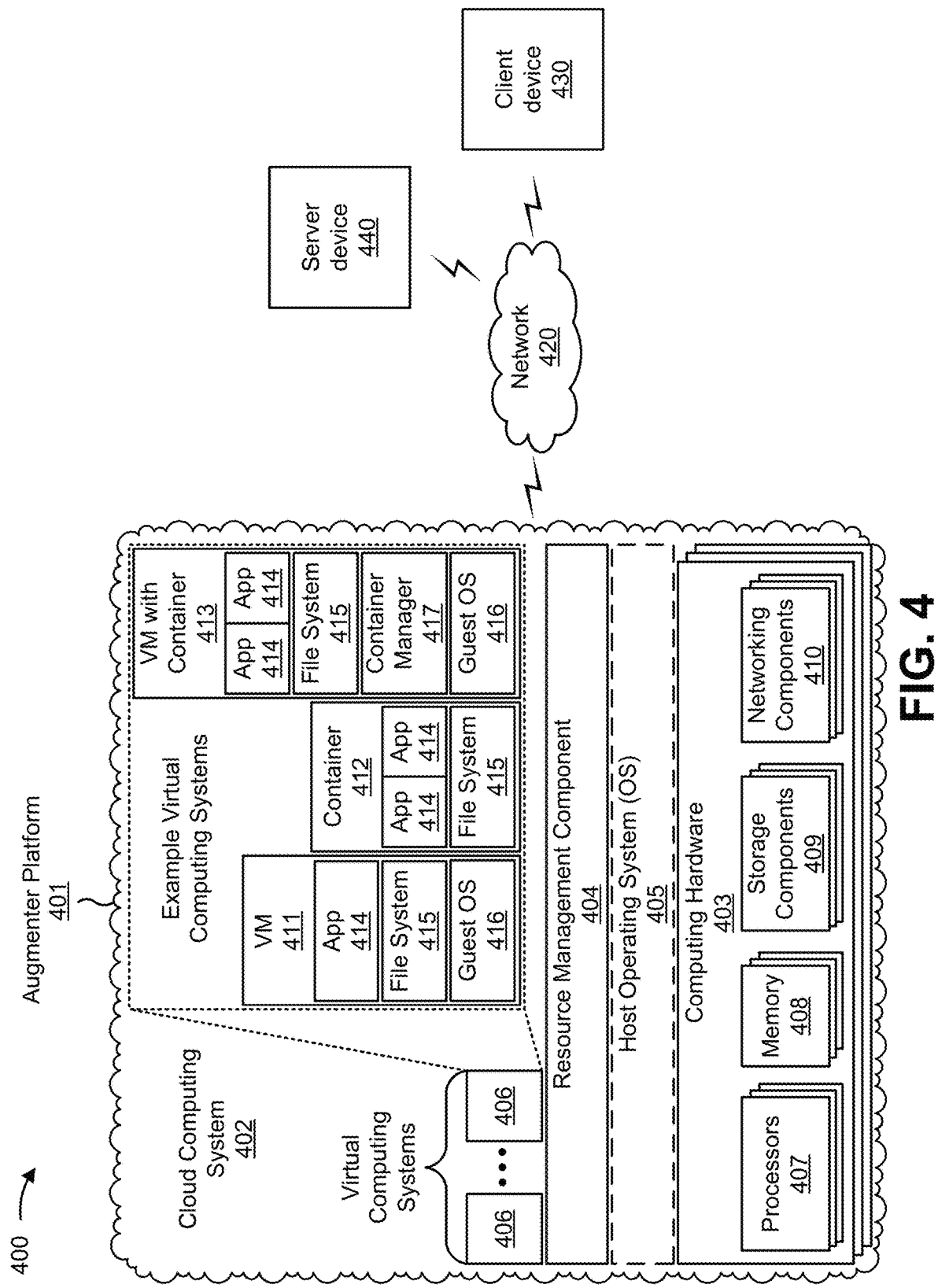
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a augmenter platform 401. The augmenter platform 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, a client device 430, and/or a server device 440. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the augmenter platform 401 to perform one or more operations or processes described herein. A storage component 409 includes a hard disk or another type of storage device that stores information, data, and/or software (e.g., code, instructions, and/or the like) related to the operation and use of the augmenter platform 401. In some implementations, memory 408 and/or storage component 409 is/are implemented as a non-transitory computer readable medium. A networking component 410 includes a network interface and corresponding hardware that enables the augmenter platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the augmenter platform 401 may include one or more elements 403-417 of the cloud computing system 402, may execute within the cloud computing system 402, and/or may be hosted within the cloud computing system 402, in some implementations, the augmenter platform 401 may not be cloud-based (e.g., may be implemented outside of a cloud computing system) or may be partially cloud-based. For example, the augmenter platform 401 may include one or more devices that are not part of the cloud computing system 402, such as device 500 of FIG. 5, which may include a standalone server or another type of computing device. The augmenter platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

Client device 430 includes one or more devices capable of receiving, generating, storing, processing, and/or providing information, such as information described herein. For example, client device 430 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 430 may receive information from and/or transmit information to augmenter platform 401 and/or server device 440.

Server device 440 includes one or more devices capable of receiving, generating, storing, processing, and/or providing information, as described herein. For example, server device 440 may include a laptop computer, a tablet computer, a desktop computer, a group of server devices, or a similar type of device. In some implementations, server device 440 may receive information from and/or transmit information to augmenter platform 401 and/or client device 430.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
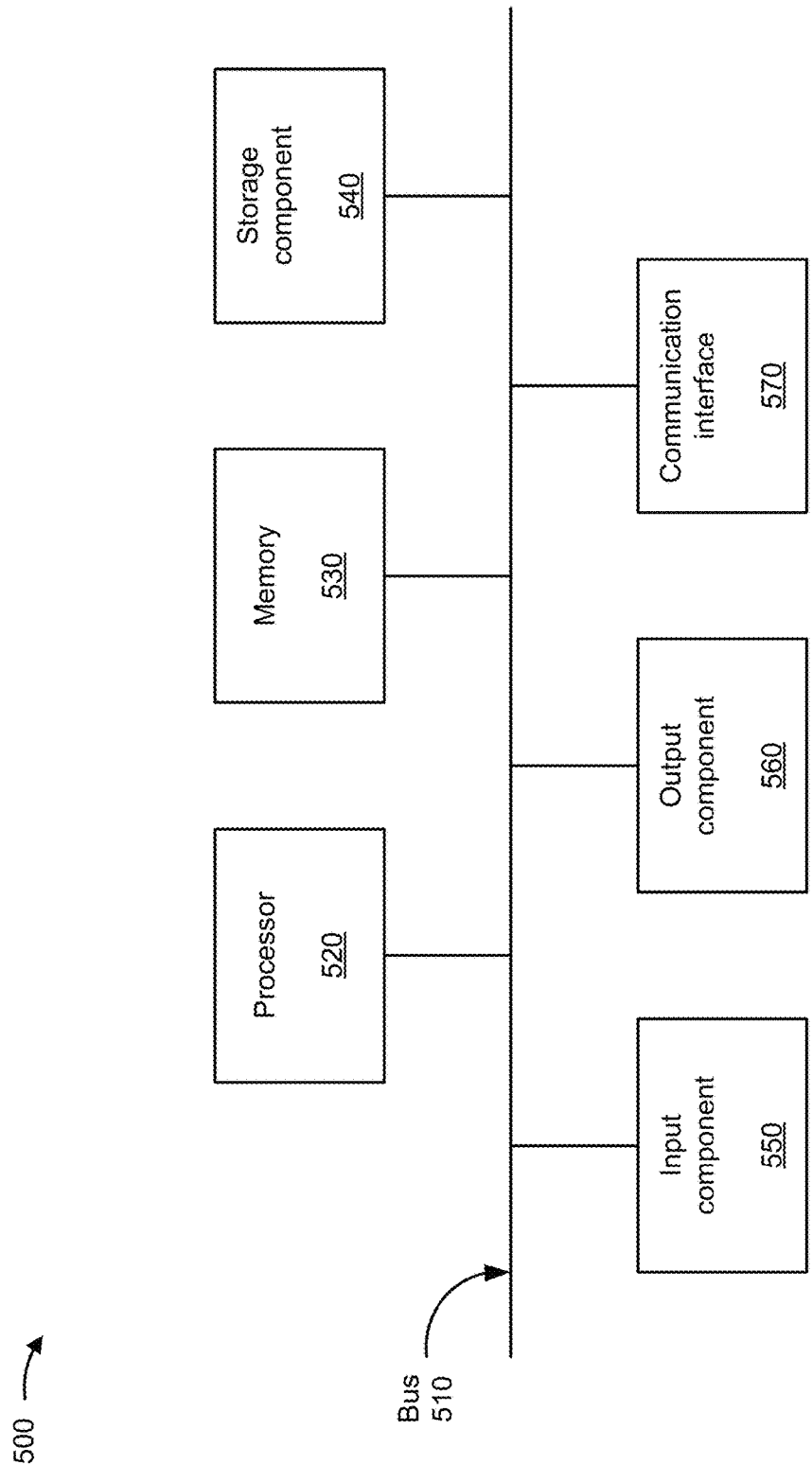
FIG. 5 is a diagram of example components of one or more devices of FIG. 4.

FIG. 5 is a diagram of example components of a device 500. Device 500 may correspond to augmenter platform 401, client device 430, and/or server device 440. In some implementations, augmenter platform 401, client device 430, and/or server device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
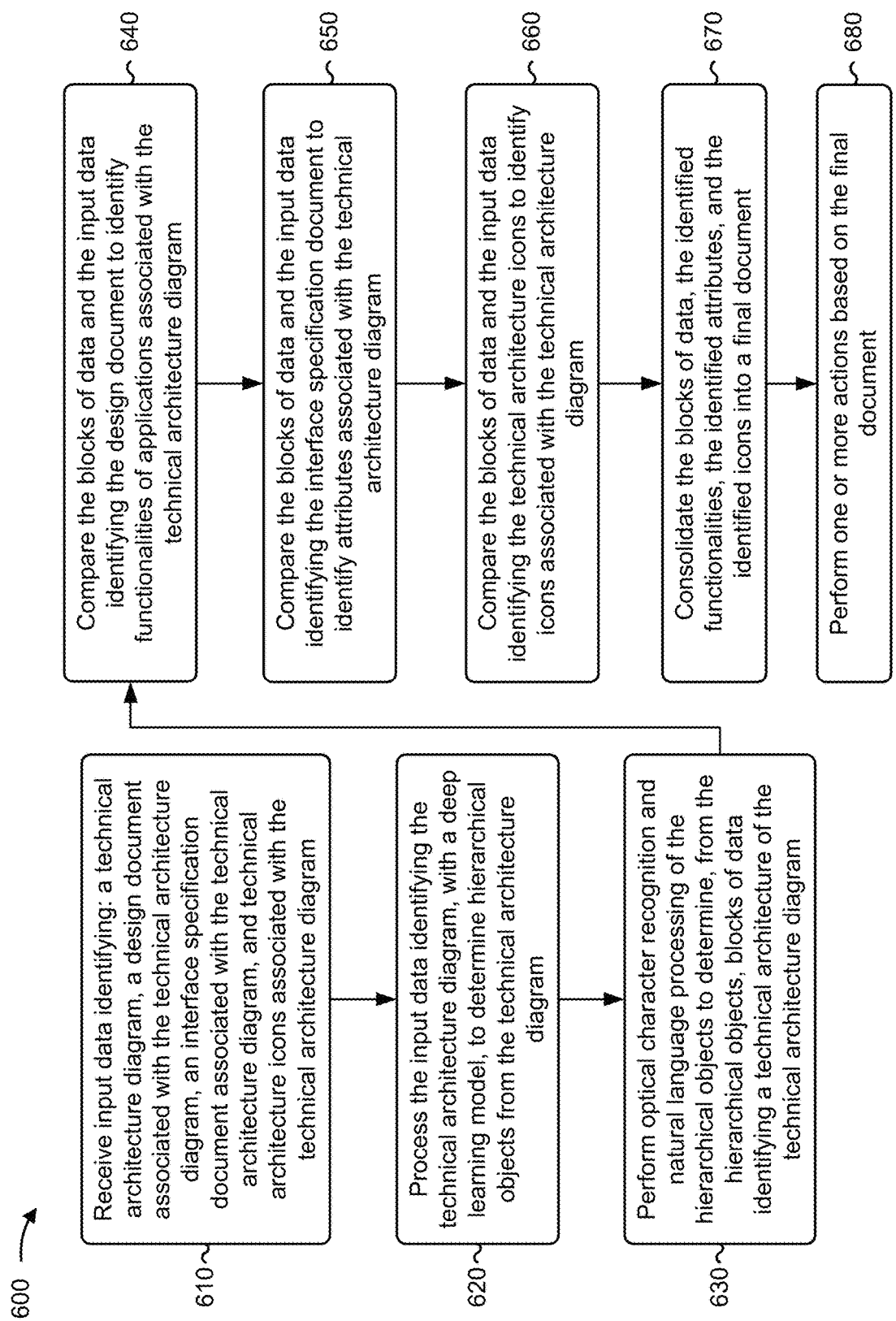
FIGS. 6-8 are flow charts of example processes for utilizing deep learning and natural language processing to convert a technical architecture diagram into an interactive technical architecture diagram.

FIG. 6 is a flow chart of an example process 600 associated with utilizing deep learning and natural language processing to convert a technical architecture diagram into an interactive technical architecture diagram. In some implementations, one or more process blocks of FIG. 6 may be performed by a device (e.g., augmenter platform 401). In some implementations, one or more process blocks of FIG. 6 may be performed by another device or a group of devices separate from or including the device, such as a client device (e.g., client device 430), a server device (e.g., server device 440), and/or the like.

As shown in FIG. 6, process 600 may include receiving input data identifying a technical architecture diagram, a design document associated with the technical architecture diagram, an interface specification document associated with the technical architecture diagram, and technical architecture icons associated with the technical architecture diagram (block 610). For example, the device (e.g., using computing hardware 403, processor 520, communication interface 570, and/or the like) may receive input data identifying a technical architecture diagram, a design document associated with the technical architecture diagram, an interface specification document associated with the technical architecture diagram, and technical architecture icons associated with the technical architecture diagram, as described above.

As further shown in FIG. 6, process 600 may include processing the input data identifying the technical architecture diagram, with a deep learning model, to determine hierarchical objects from the technical architecture diagram (block 620). For example, the device (e.g., using computing hardware 403, processor 520, memory 530, and/or the like) may process the input data identifying the technical architecture diagram, with a deep learning model, to determine hierarchical objects from the technical architecture diagram, as described above.

As further shown in FIG. 6, process 600 may include performing optical character recognition and natural language processing of the hierarchical objects to determine, from the hierarchical objects, blocks of data identifying a technical architecture of the technical architecture diagram (block 630). For example, the device (e.g., using computing hardware 403, processor 520, storage component 540, and/or the like) may perform optical character recognition and natural language processing of the hierarchical objects to determine, from the hierarchical objects, blocks of data identifying a technical architecture of the technical architecture diagram, as described above.

As further shown in FIG. 6, process 600 may include comparing the blocks of data and the input data identifying the design document to identify functionalities of applications associated with the technical architecture diagram (block 640). For example, the device (e.g., using computing hardware 403, processor 520, memory 530, and/or the like) may compare the blocks of data and the input data identifying the design document to identify functionalities of applications associated with the technical architecture diagram, as described above.

As further shown in FIG. 6, process 600 may include comparing the blocks of data and the input data identifying the interface specification document to identify attributes associated with the technical architecture diagram (block 650). For example, the device (e.g., using computing hardware 403, processor 520, storage component 540, and/or the like) may compare the blocks of data and the input data identifying the interface specification document to identify attributes associated with the technical architecture diagram, as described above.

As further shown in FIG. 6, process 600 may include comparing the blocks of data and the input data identifying the technical architecture icons to identify icons associated with the technical architecture diagram (block 660). For example, the device (e.g., using computing hardware 403, processor 520, memory 530, storage component 540, and/or the like) may compare the blocks of data and the input data identifying the technical architecture icons to identify icons associated with the technical architecture diagram, as described above.

As further shown in FIG. 6, process 600 may include consolidating the blocks of data, the identified functionalities, the identified attributes, and the identified icons into a final document (block 670). For example, the device (e.g., using computing hardware 403, processor 520, memory 530, and/or the like) may consolidate the blocks of data, the identified functionalities, the identified attributes, and the identified icons into a final document, as described above.

As further shown in FIG. 6, process 600 may include performing one or more actions based on the final document (block 680). For example, the device (e.g., using computing hardware 403, processor 520, memory 530, storage component 540, communication interface 570, and/or the like) may perform one or more actions based on the final document, as described above.

Process 600 may include additional implementations, such as any single implementation or any combination of implementations described below and/or in connection with one or more other processes described elsewhere herein.

In a first implementation, performing the one or more actions includes generating an interactive technical architecture diagram based on the final document; generating a technical architecture summary document based on the final document; or generating data identifying the attributes based on the final document.

In a second implementation, alone or in combination with the first implementation, performing the one or more actions includes generating snippets for the technical architecture diagram based on the final document; providing the final document to a client device; or retraining the deep learning model based on the final document.

In a third implementation, alone or in combination with one or more of the first and second implementations, process 600 includes training the deep learning model with historical icon data is identifying icons in historical technical architecture diagrams, historical interconnection data is identifying interconnections in the historical technical architecture diagrams, and historical legend data identifying legends in the historical technical architecture diagrams.

In a fourth implementation, alone or in combination with one or more of the first through third implementations, performing the one or more actions include providing, to a client device an interactive technical architecture diagram generated based on the final document, a technical architecture summary document generated based on the final document, data identifying the attributes, or data identifying snippets generated based on the final document.

In a fifth implementation, alone or in combination with one or more of the first through fourth implementations, performing the one or more actions includes generating an interactive technical architecture diagram based on the final document; providing the interactive technical architecture diagram to a client device; receiving, from the client device, an interactive input associated with the interactive technical architecture diagram; modifying the interactive technical architecture diagram based on the interactive input and to generate a modified interactive technical architecture diagram; and providing the modified interactive technical architecture diagram to the client device.

In a sixth implementation, alone or in combination with one or more of the first through fifth implementations, performing the one or more actions include generating an interactive technical architecture diagram based on the final document; providing the interactive technical architecture diagram to a client device; receiving, from the client device, one or more changes to the interactive technical architecture diagram; and modifying the interactive technical architecture diagram based on the one or more changes and to generate a modified interactive technical architecture diagram.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
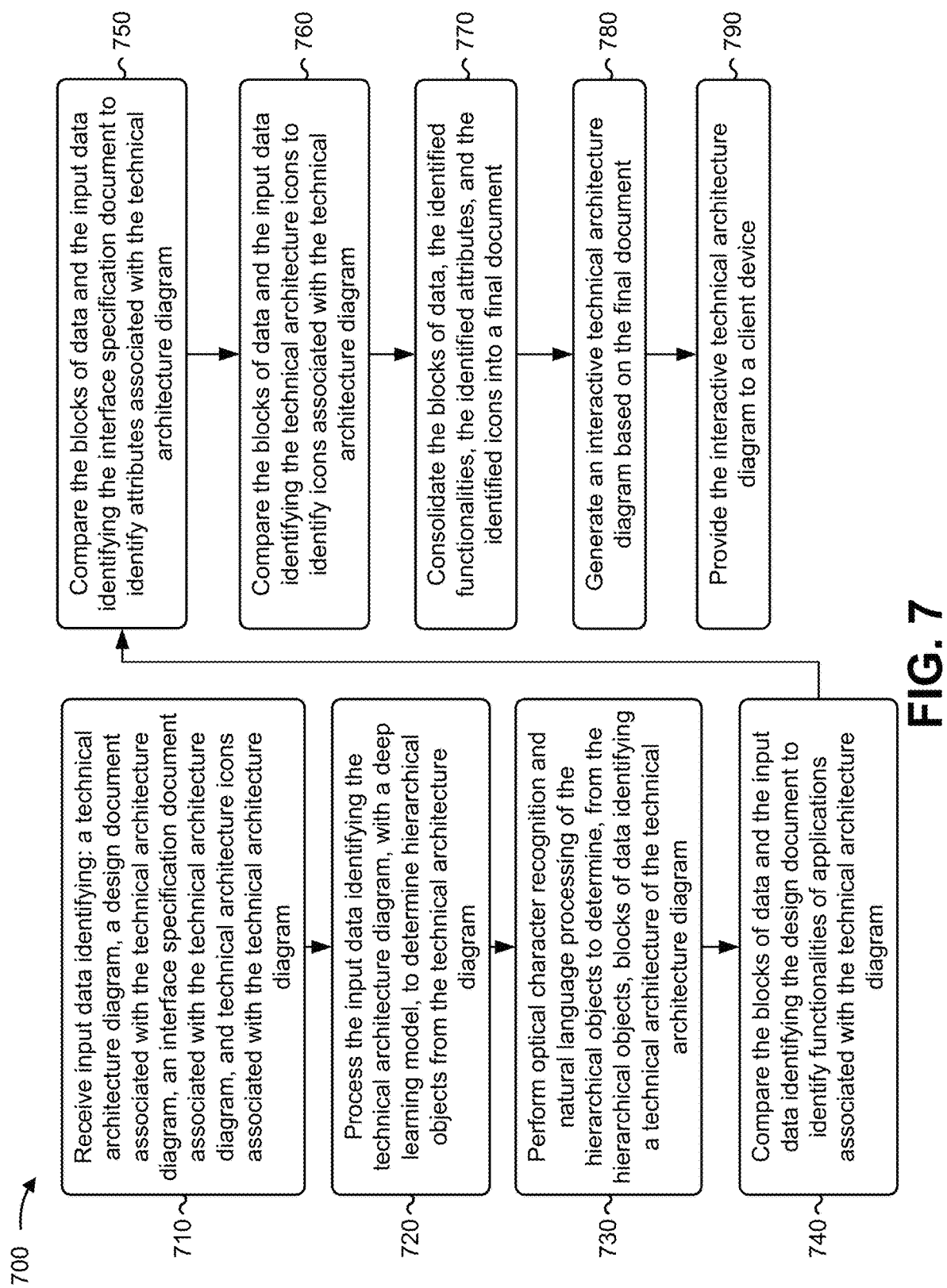

FIG. 7 is a flow chart of an example process 700 associated with utilizing deep learning and natural language processing to convert a technical architecture diagram into an interactive technical architecture diagram. In some implementations, one or more process blocks of FIG. 7 may be performed by a device (e.g., augmenter platform 401). In some implementations, one or more process blocks of FIG. 7 may be performed by another device or a group of devices separate from or including the device, such as a client device (e.g., client device 430), a server device (e.g., server device 440), and/or the like.

As shown in FIG. 7, process 700 may include receiving input data identifying a technical architecture diagram, a design document associated with the technical architecture diagram, an interface specification document associated with the technical architecture diagram, and technical architecture icons associated with the technical architecture diagram (block 710). For example, the device (e.g., using computing hardware 403, processor 520, communication interface 570, and/or the like) may receive input data identifying a technical architecture diagram, a design document associated with the technical architecture diagram, an interface specification document associated with the technical architecture diagram, and technical architecture icons associated with the technical architecture diagram, as described above.

As further shown in FIG. 7, process 700 may include processing the input data identifying the technical architecture diagram, with a deep learning model, to determine hierarchical objects from the technical architecture diagram (block 720). For example, the device (e.g., using computing hardware 403, processor 520, memory 530, and/or the like) may process the input data identifying the technical architecture diagram, with a deep learning model, to determine hierarchical objects from the technical architecture diagram, as described above.

As further shown in FIG. 7, process 700 may include performing optical character recognition and natural language processing of the hierarchical objects to determine, from the hierarchical objects, blocks of data identifying a technical architecture of the technical architecture diagram (block 730). For example, the device (e.g., using computing hardware 403, processor 520, storage component 540, and/ or the like) may perform optical character recognition and natural language processing of the hierarchical objects to determine, from the hierarchical objects, blocks of data identifying a technical architecture of the technical architecture diagram, as described above.

As further shown in FIG. 7, process 700 may include comparing the blocks of data and the input data identifying the design document to identify functionalities of applications associated with the technical architecture diagram (block 740). For example, the device (e.g., using computing hardware 403, processor 520, memory 530, and/or the like) may compare the blocks of data and the input data identifying the design document to identify functionalities of applications associated with the technical architecture diagram, as described above.

As further shown in FIG. 7, process 700 may include comparing the blocks of data and the input data identifying the interface specification document to identify attributes associated with the technical architecture diagram (block 750). For example, the device (e.g., using computing hardware 403, processor 520, storage component 540, and/or the like) may compare the blocks of data and the input data identifying the interface specification document to identify attributes associated with the technical architecture diagram, as described above.

As further shown in FIG. 7, process 700 may include comparing the blocks of data and the input data identifying the technical architecture icons to identify icons associated with the technical architecture diagram (block 760). For example, the device (e.g., using computing hardware 403, processor 520, memory 530, storage component 540, and/or the like) may compare the blocks of data and the input data identifying the technical architecture icons to identify icons associated with the technical architecture diagram, as described above.

As further shown in FIG. 7, process 700 may include consolidating the blocks of data, the identified functionalities, the identified attributes, and the identified icons into a final document (block 770). For example, the device (e.g., using computing hardware 403, processor 520, memory 530, and/or the like) may consolidate the blocks of data, the identified functionalities, the identified attributes, and the identified icons into a final document, as described above.

As further shown in FIG. 7, process 700 may include generating an interactive technical architecture diagram based on the final document (block 780). For example, the device (e.g., using computing hardware 403, processor 520, storage component 540, and/or the like) may generate an interactive technical architecture diagram based on the final document, as described above.

As further shown in FIG. 7, process 700 may include providing the interactive technical architecture diagram to a client device (block 790). For example, the device (e.g., using computing hardware 403, processor 520, memory 530, communication interface 570, and/or the like) may provide the interactive technical architecture diagram to a client device, as described above.

Process 700 may include additional implementations, such as any single implementation or any combination of implementations described below and/or in connection with one or more other processes described elsewhere herein.

In a first implementation, process 700 includes processing the input data identifying the technical architecture diagram, with the deep learning model, to determine a hierarchical order associated with the hierarchical objects.

In a second implementation, alone or in combination with the first implementation, process 700 includes converting the input data identifying the technical architecture diagram into formatted data in a format compatible with the deep learning model; and processing the formatted data, with the deep learning model, to determine the hierarchical objects from the technical architecture diagram.

In a third implementation, alone or in combination with one or more of the first and second implementations, process 700 includes generating, based on the final document, a technical architecture summary document that provides a description of functional components of the technical architecture diagram; and providing the technical architecture summary document to the client device.

In a fourth implementation, alone or in combination with one or more of the first through third implementations, the hierarchical objects include a title of the technical architecture diagram, a quantity of blocks in the technical architecture diagram, a quantity of sub-blocks in the technical architecture diagram, a legend of the technical architecture diagram, an arrow of the technical architecture diagram, a connector of the technical architecture diagram, or an icon of the technical architecture diagram.

In a fifth implementation, alone or in combination with one or more of the first through fourth implementations, the blocks of data include text provided in the technical architecture diagram.

In a sixth implementation, alone or in combination with one or more of the first through fifth implementations, the final document is provided in a particular format.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
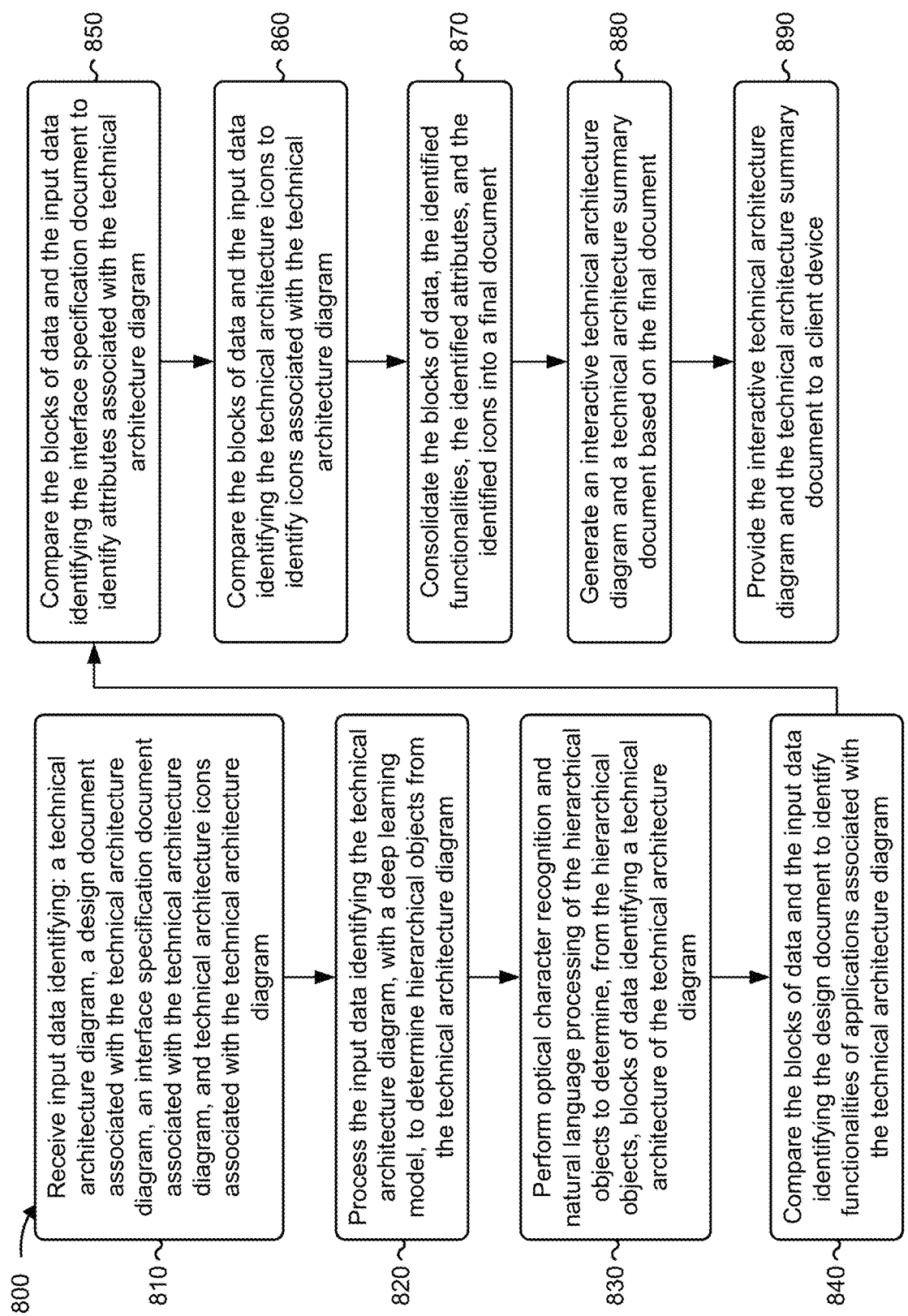

FIG. 8 is a flow chart of an example process 800 associated with utilizing deep learning and natural language processing to convert a technical architecture diagram into an interactive technical architecture diagram. In some implementations, one or more process blocks of FIG. 8 may be performed by a device (e.g., augmenter platform 401). In some implementations, one or more process blocks of FIG. 8 may be performed by another device or a group of devices separate from or including the device, such as a client device (e.g., client device 430), a server device (e.g., server device 440), and/or the like.

As shown in FIG. 8, process 800 may include receiving input data identifying a technical architecture diagram, a design document associated with the technical architecture diagram, an interface specification document associated with the technical architecture diagram, and technical architecture icons associated with the technical architecture diagram (block 810). For example, the device (e.g., using computing hardware 403, processor 520, communication interface 570, and/or the like) may receive input data identifying a technical architecture diagram, a design document associated with the technical architecture diagram, an interface specification document associated with the technical architecture diagram, and technical architecture icons associated with the technical architecture diagram, as described above.

As further shown in FIG. 8, process 800 may include processing the input data identifying the technical architecture diagram, with a deep learning model, to determine hierarchical objects from the technical architecture diagram (block 820). For example, the device (e.g., using computing hardware 403, processor 520, memory 530, and/or the like) may process the input data identifying the technical architecture diagram, with a deep learning model, to determine hierarchical objects from the technical architecture diagram, as described above.

As further shown in FIG. 8, process 800 may include performing optical character recognition and natural language processing of the hierarchical objects to determine, from the hierarchical objects, blocks of data identifying a technical architecture of the technical architecture diagram (block 830). For example, the device (e.g., using computing hardware 403, processor 520, storage component 540, and/or the like) may perform optical character recognition and natural language processing of the hierarchical objects to determine, from the hierarchical objects, blocks of data identifying a technical architecture of the technical architecture diagram, as described above.

As further shown in FIG. 8, process 800 may include comparing the blocks of data and the input data identifying the design document to identify functionalities of applications associated with the technical architecture diagram (block 840). For example, the device (e.g., using computing hardware 403, processor 520, memory 530, and/or the like) may compare the blocks of data and the input data identifying the design document to identify functionalities of applications associated with the technical architecture diagram, as described above.

As further shown in FIG. 8, process 800 may include comparing the blocks of data and the input data identifying the interface specification document to identify attributes associated with the technical architecture diagram (block 850). For example, the device (e.g., using computing hardware 403, processor 520, storage component 540, and/or the like) may compare the blocks of data and the input data identifying the interface specification document to identify attributes associated with the technical architecture diagram, as described above.

As further shown in FIG. 8, process 800 may include comparing the blocks of data and the input data identifying the technical architecture icons to identify icons associated with the technical architecture diagram (block 860). For example, the device (e.g., using computing hardware 403, processor 520, memory 530, storage component 540, and/or the like) may compare the blocks of data and the input data identifying the technical architecture icons to identify icons associated with the technical architecture diagram, as described above.

As further shown in FIG. 8, process 800 may include consolidating the blocks of data, the identified functionalities, the identified attributes, and the identified icons into a final document (block 870). For example, the device (e.g., using computing hardware 403, processor 520, memory 530, and/or the like) may consolidate the blocks of data, the identified functionalities, the identified attributes, and the identified icons into a final document, as described above.

As further shown in FIG. 8, process 800 may include generating an interactive technical architecture diagram and a technical architecture summary document based on the final document (block 880). For example, the device (e.g., using computing hardware 403, processor 520, storage component 540, and/or the like) may generate an interactive technical architecture diagram and a technical architecture summary document based on the final document, as described above.

As further shown in FIG. 8, process 800 may include providing the interactive technical architecture diagram and the technical architecture summary document to a client device (block 890). For example, the device (e.g., using computing hardware 403, processor 520, memory 530, storage component 540, communication interface 570, and/or the like) may provide the interactive technical architecture diagram and the technical architecture summary document to a client device, as described above.

Process 800 may include additional implementations, such as any single implementation or any combination of implementations described below and/or in connection with one or more other processes described elsewhere herein.

In a first implementation, process 800 includes generating data identifying the attributes based on the final document; generating snippets for the technical architecture diagram based on the final document; providing the final document to a client device; or retraining the deep learning model based on the final document.

In a second implementation, alone or in combination with the first implementation, process 800 includes receiving, from the client device, an interactive input associated with the interactive technical architecture diagram; modifying the interactive technical architecture diagram based on the interactive input and to generate a modified interactive technical architecture diagram; and providing the modified interactive technical architecture diagram to the client device.

In a third implementation, alone or in combination with one or more of the first and second implementations, process 800 includes receiving, from the client device, one or more changes to the interactive technical architecture diagram; modifying the interactive technical architecture diagram based on the one or more changes and to generate a modified interactive technical architecture diagram; and providing the modified interactive technical architecture diagram to the client device.

In a fourth implementation, alone or in combination with one or more of the first through third implementations, process 800 includes converting the input data identifying the technical architecture diagram into formatted data in a format compatible with the deep learning model; and processing the formatted data, with the deep learning model, to determine the hierarchical objects from the technical architecture diagram.

In a fifth implementation, alone or in combination with one or more of the first through fourth implementations, the hierarchical objects include one or more of: a title of the technical architecture diagram, a quantity of blocks in the technical architecture diagram, a quantity of sub-blocks in the technical architecture diagram, a legend of the technical architecture diagram, an arrow of the technical architecture diagram, a connector of the technical architecture diagram, or an icon of the technical architecture diagram.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    training, by a device, a deep learning model with:
        historical icon data identifying icons in historical technical architecture diagrams,
        historical interconnection data identifying interconnections in the historical technical architecture diagrams, and
        historical legend data identifying legends in the historical technical architecture diagrams;
    receiving, by the device, input data identifying:
        a technical architecture diagram,
        a design document associated with the technical architecture diagram,
        an interface specification document associated with the technical architecture diagram, and
        technical architecture icons associated with the technical architecture diagram;
    processing, by the device, the input data identifying the technical architecture diagram, with the deep learning model, to determine hierarchical objects from the technical architecture diagram;
    performing, by the device, optical character recognition and natural language processing of the hierarchical objects to determine, from the hierarchical objects, blocks of data identifying a technical architecture of the technical architecture diagram;
    comparing, by the device, the blocks of data and the input data identifying the design document to identify functionalities of applications associated with the technical architecture diagram;
    comparing, by the device, the blocks of data and the input data identifying the interface specification document to identify attributes associated with the technical architecture diagram;
    comparing, by the device, the blocks of data and the input data identifying the technical architecture icons to identify icons associated with the technical architecture diagram;
    consolidating, by the device, the blocks of data, the identified functionalities, the identified attributes, and the identified icons into a final document; and
    performing, by the device, one or more actions based on the final document.

2. The method of claim 1, wherein performing the one or more actions comprises one or more of:
    generating an interactive technical architecture diagram based on the final document;
    generating a technical architecture summary document based on the final document; or
    generating data identifying the attributes based on the final document.

3. The method of claim 1, wherein performing the one or more actions comprises one or more of:
    generating snippets for the technical architecture diagram based on the final document;
    providing the final document to a client device; or
    retraining the deep learning model based on the final document.

4. The method of claim 1, wherein performing the one or more actions comprises:
    providing, to a client device, one or more of:
        an interactive technical architecture diagram generated based on the final document,
        a technical architecture summary document generated based on the final document,
        data identifying the attributes, or
        data identifying snippets generated based on the final document.

5. The method of claim 1, wherein performing the one or more actions comprises:
    generating an interactive technical architecture diagram based on the final document;
    providing the interactive technical architecture diagram to a client device;
    receiving, from the client device, an interactive input associated with the interactive technical architecture diagram;

modifying the interactive technical architecture diagram based on the interactive input and to generate a modified interactive technical architecture diagram; and providing the modified interactive technical architecture diagram to the client device.

6. The method of claim 1, wherein performing the one or more actions comprises:

generating an interactive technical architecture diagram based on the final document;

providing the interactive technical architecture diagram to a client device;

receiving, from the client device, one or more changes to the interactive technical architecture diagram; and modifying the interactive technical architecture diagram based on the one or more changes and to generate a modified interactive technical architecture diagram.

7. The method of claim 1, wherein the blocks of data are in a JavaScript Object Notation (JSON) format.

8. A device, comprising:

one or more memories; and one or more processors, communicatively coupled to the one or more memories, configured to:

train a deep learning model with:

historical icon data identifying icons in historical technical architecture diagrams, historical interconnection data identifying interconnections in the historical technical architecture diagrams, and historical legend data identifying legends in the historical technical architecture diagrams;

receive input data identifying:

a technical architecture diagram, a design document associated with the technical architecture diagram, an interface specification document associated with the technical architecture diagram, and technical architecture icons associated with the technical architecture diagram;

process the input data identifying the technical architecture diagram, with the deep learning model, to determine hierarchical objects from the technical architecture diagram;

perform optical character recognition and natural language processing of the hierarchical objects to determine, from the hierarchical objects, blocks of data identifying a technical architecture of the technical architecture diagram;

compare the blocks of data and the input data identifying the design document to identify functionalities of applications associated with the technical architecture diagram;

compare the blocks of data and the input data identifying the interface specification document to identify attributes associated with the technical architecture diagram;

compare the blocks of data and the input data identifying the technical architecture icons to identify icons associated with the technical architecture diagram;

consolidate the blocks of data, the identified functionalities, the identified attributes, and the identified icons into a final document;

generate an interactive technical architecture diagram based on the final document; and provide the interactive technical architecture diagram to a client device.

9. The device of claim 8, wherein the one or more processors, to process the input data identifying the technical architecture diagram, with the deep learning model, to determine the hierarchical objects from the technical architecture diagram, are:

process the input data identifying the technical architecture diagram, with the deep learning model, to determine a hierarchical order associated with the hierarchical objects.

10. The device of claim 8, wherein the one or more processors, to process the input data identifying the technical architecture diagram, with the deep learning model, to determine the hierarchical objects from the technical architecture diagram, are:

convert the input data identifying the technical architecture diagram into formatted data in a format compatible with the deep learning model; and process the formatted data, with the deep learning model, to determine the hierarchical objects from the technical architecture diagram.

11. The device of claim 8, wherein the one or more processors are further configured to:

generate, based on the final document, a technical architecture summary document that provides a description of functional components of the technical architecture diagram; and provide the technical architecture summary document to the client device.

12. The device of claim 8, wherein the hierarchical objects include one or more of:

a title of the technical architecture diagram, a quantity of blocks in the technical architecture diagram, a quantity of sub-blocks in the technical architecture diagram, a legend of the technical architecture diagram, an arrow of the technical architecture diagram, a connector of the technical architecture diagram, or an icon of the technical architecture diagram.

13. The device of claim 8, wherein the blocks of data include text provided in the technical architecture diagram.

14. The device of claim 8, wherein the final document is provided in a particular format.

15. A non-transitory computer-readable medium storing instructions, the instructions comprising:

one or more instructions that, when executed by one or more processors, cause the one or more processors to:

train a deep learning model with:

historical icon data identifying icons in historical technical architecture diagrams, historical interconnection data identifying interconnections in the historical technical architecture diagrams, and historical legend data identifying legends in the historical technical architecture diagrams;

receive input data identifying:

a technical architecture diagram, a design document associated with the technical architecture diagram, an interface specification document associated with the technical architecture diagram, and technical architecture icons associated with the technical architecture diagram;

process the input data identifying the technical architecture diagram, with the deep learning model, to determine hierarchical objects from the technical architecture diagram;

perform optical character recognition and natural language processing of the hierarchical objects to determine, from the hierarchical objects, blocks of data identifying a technical architecture of the technical architecture diagram;

compare the blocks of data and the input data identifying the design document to identify functionalities of applications associated with the technical architecture diagram;

compare the blocks of data and the input data identifying the interface specification document to identify attributes associated with the technical architecture diagram;

compare the blocks of data and the input data identifying the technical architecture icons to identify icons associated with the technical architecture diagram;

consolidate the blocks of data, the identified functionalities, the identified attributes, and the identified icons into a final document;

generate an interactive technical architecture diagram and a technical architecture summary document based on the final document; and provide the interactive technical architecture diagram and the technical architecture summary document to a client device.

16. The non-transitory computer-readable medium of claim 15, wherein the instructions further comprise:
one or more instructions that, when executed by the one or more processors, cause the one or more processors to one or more of:
generate data identifying the attributes based on the final document;
generate snippets for the technical architecture diagram based on the final document;
provide the final document to the client device; or
retrain the deep learning model based on the final document.

17. The non-transitory computer-readable medium of claim 15, wherein the instructions further comprise:
one or more instructions that, when executed by the one or more processors, cause the one or more processors to one or more of:
receive, from the client device, an interactive input associated with the interactive technical architecture diagram;
modify the interactive technical architecture diagram based on the interactive input and to generate a modified interactive technical architecture diagram; and
provide the modified interactive technical architecture diagram to the client device.

18. The non-transitory computer-readable medium of claim 15, wherein the instructions further comprise:
one or more instructions that, when executed by the one or more processors, cause the one or more processors to one or more of:
receive, from the client device, one or more changes to the interactive technical architecture diagram;
modify the interactive technical architecture diagram based on the one or more changes and to generate a modified interactive technical architecture diagram; and
provide the modified interactive technical architecture diagram to the client device.

19. The non-transitory computer-readable medium of claim 15, wherein the one or more instructions, that cause the one or more processors to process the input data identifying the technical architecture diagram, with the deep learning model, to determine the hierarchical objects from the technical architecture diagram, cause the one or more processors to:
convert the input data identifying the technical architecture diagram into formatted data in a format compatible with the deep learning model; and
process the formatted data, with the deep learning model, to determine the hierarchical objects from the technical architecture diagram.

20. The non-transitory computer-readable medium of claim 15, wherein the hierarchical objects include one or more of:
a title of the technical architecture diagram,
a quantity of blocks in the technical architecture diagram,
a quantity of sub-blocks in the technical architecture diagram,
a legend of the technical architecture diagram,
an arrow of the technical architecture diagram,
a connector of the technical architecture diagram, or
an icon of the technical architecture diagram.

* * * * *